United States Patent
Chen

(10) Patent No.: US 9,226,262 B2
(45) Date of Patent: Dec. 29, 2015

(54) LOCATION MODEL UPDATING APPARATUS AND POSITION ESTIMATING METHOD

(71) Applicant: FUJITSU LIMITED, Kawasaki-shi, Kanagawa (JP)

(72) Inventor: Bin Chen, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/462,747

(22) Filed: Aug. 19, 2014

(65) Prior Publication Data

US 2015/0094088 A1   Apr. 2, 2015

(30) Foreign Application Priority Data

Sep. 27, 2013   (JP) ................. 2013-202018

(51) Int. Cl.
  *H04M 1/10*   (2006.01)
  *H04W 64/00*  (2009.01)
  *G01S 5/00*   (2006.01)

(52) U.S. Cl.
  CPC . *H04W 64/00* (2013.01); *G01S 5/00* (2013.01)

(58) Field of Classification Search
  CPC ....... H04W 64/00; H04W 4/02; H04W 4/023; G01S 5/0252; G01S 2205/008; G01S 5/0009; G01S 5/0054
  USPC ..................................................... 455/456.1
  See application file for complete search history.

(56) References Cited

U.S. PATENT DOCUMENTS

| | | | |
|---|---|---|---|
| 2005/0202780 A1* | 9/2005 | Kall et al. ................ | 455/1 |
| 2010/0039929 A1* | 2/2010 | Cho et al. ................ | 370/216 |
| 2012/0149325 A1* | 6/2012 | Titus et al. .............. | 455/404.2 |
| 2013/0184003 A1  | 7/2013 | Alizadeh-Shabdiz et al. | |
| 2014/0148970 A1* | 5/2014 | Dufford et al. .......... | 701/1 |

FOREIGN PATENT DOCUMENTS

| | | |
|---|---|---|
| JP | 2012-145586 | 8/2012 |
| JP | 2013-053930 | 3/2013 |
| JP | 2013-059237 | 3/2013 |

* cited by examiner

*Primary Examiner* — Don N Vo
(74) *Attorney, Agent, or Firm* — Fujitsu Patent Center

(57) ABSTRACT

A location model updating apparatus generates attribute data including an attribute of a location and an attribute between locations. A peripheral location is extracted by including each location from a current location of a terminal apparatus to a first front as a member of a definite peripheral location list, including each location from the first front to a second front as a member of a candidate peripheral location list, and updating each location that is a member of the definite peripheral location list and exists from the current location to the first front, and each location that is a member of the candidate peripheral location list and exists from the first front to the second front, using the current location of the terminal apparatus as a query. Data of a peripheral location model of the extracted peripheral location is transmitted to the terminal apparatus.

12 Claims, 22 Drawing Sheets

FIG.4

| AP NUMBER | MAC ADDRESS OF AP | AP COVERING LOCATION LIST 100 | | |
|---|---|---|---|---|
| | | | | |
| 1 | M1 | LOCATION NAME L1 | LOCATION NAME L2 | LOCATION NAME L3 |
| 2 | M2 | LOCATION NAME L1 | LOCATION NAME L2 | LOCATION NAME L3 |
| ... | ... | ... | ... | ... |

FIG.5

| LOCA-TION NUMBER | LOCA-TION NAME | THRESHOLD VALUE | OBSERVABLE AP LIST ⟨200 | | | | | | | | | | | | | | | |
|---|---|---|---|---|---|---|---|---|---|---|---|---|---|---|---|---|---|---|
| | | | MAC ADDRESS | | | | | | MAC ADDRESS | | | | | | MAC ADDRESS | | | |
| | | | MISSING PROBA-BILITY | OBSERV-ING PROBA-BILITY | OBSERVING PROBABILITY FOR EACH STRENGTH LEVEL | | | | MISSING PROBA-BILITY | OBSERV-ING PROBA-BILITY | OBSERVING PROBABILITY FOR EACH STRENGTH LEVEL | | | | MISSING PROBA-BILITY | OBSERV-ING PROBA-BILITY | OBSERVING PROBABILITY FOR EACH STRENGTH LEVEL | |
| | | | | | 1 | 2 | 3 | 4 | | | 1 | 2 | 3 | 4 | | | 1 | 2 | 3 | 4 |
| 1 | L1 | | | | | | | | | | | | | | | | | |
| 2 | L2 | | | | | | | | | | | | | | | | | |
| ... | | | | | | | | | | | | | | | | | | |

FIG.13

|  | LOCATION L0 | LOCATION L1 | LOCATION L2 | ... |
|---|---|---|---|---|
| LOCATION L0 | — | S01 | S02 |  |
| LOCATION L1 |  | — | S12 |  |
| LOCATION L2 |  |  | — |  |
| ... |  |  |  |  |

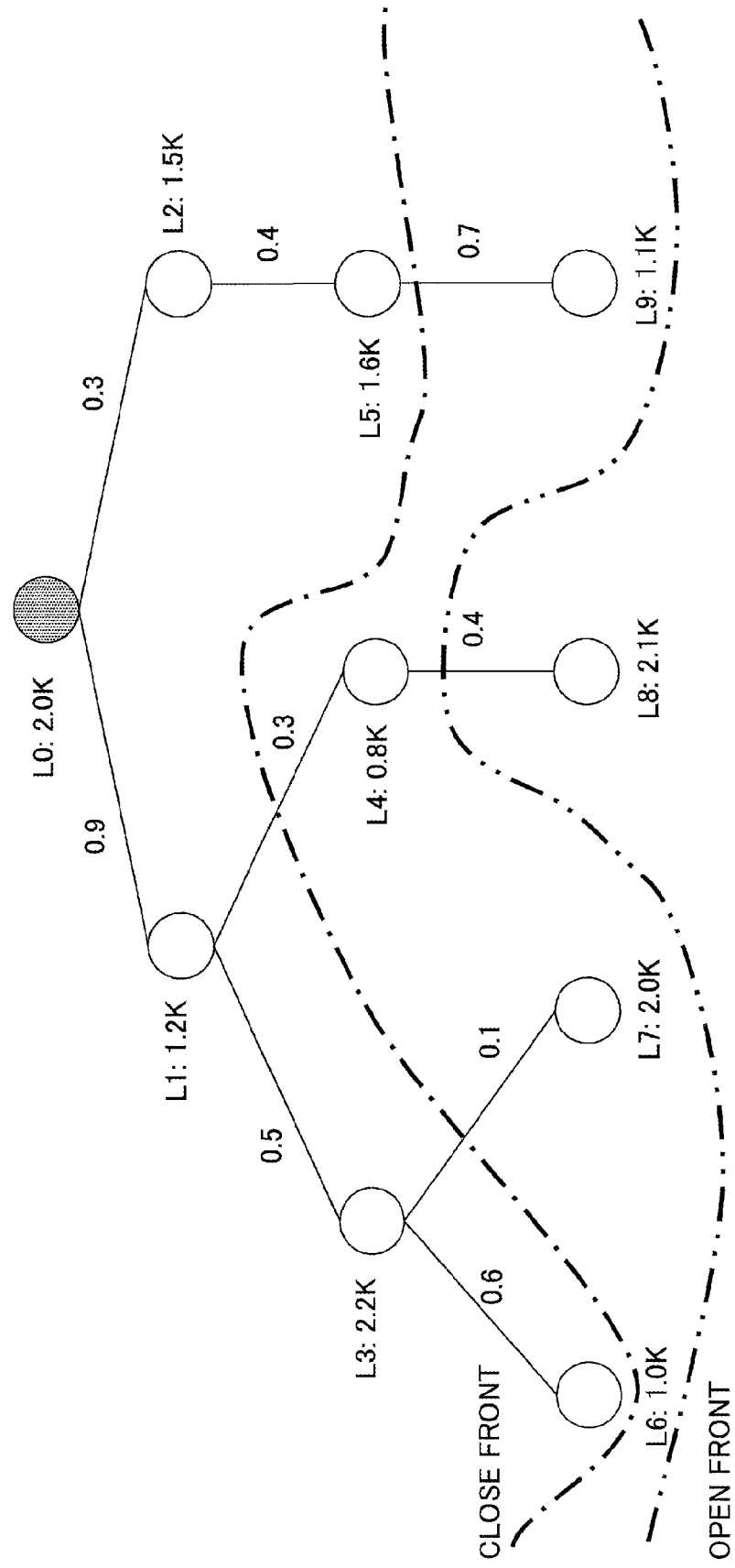

FIG.21

| LOCATION NUMBER | LOCATION NAME | THRESHOLD VALUE | CLOSE FRONT TAG | OBSERVABLE AP LIST ⟨200 | | | | | | | | | | | | | | | | |
|---|---|---|---|---|---|---|---|---|---|---|---|---|---|---|---|---|---|---|---|---|
| | | | | MAC ADDRESS | | | | | | MAC ADDRESS | | | | | | MAC ADDRESS | | | | |
| | | | | MISSING PROBABILITY | OBSERVING PROBABILITY | OBSERVING PROBABILITY FOR EACH STRENGTH LEVEL | | | | MISSING PROBABILITY | OBSERVING PROBABILITY | OBSERVING PROBABILITY FOR EACH STRENGTH LEVEL | | | | MISSING PROBABILITY | OBSERVING PROBABILITY | OBSERVING PROBABILITY FOR EACH STRENGTH LEVEL | | | |
| | | | | | | 1 | 2 | 3 | 4 | | | 1 | 2 | 3 | 4 | | | 1 | 2 | 3 | 4 |
| 1 | L1 | | | | | | | | | | | | | | | | | | | | |
| 2 | L2 | | | | | | | | | | | | | | | | | | | | |
| ... | | | | | | | | | | | | | | | | | | | | | |

LOCATION MODEL UPDATING APPARATUS AND POSITION ESTIMATING METHOD

CROSS-REFERENCE TO RELATED APPLICATIONS

This application is based upon and claims the benefit of priority of the prior Japanese Patent Application No. 2013-202018, filed on Sep. 27, 2013, the entire contents of which are incorporated herein by reference.

FIELD

The embodiments discussed herein are related to a location model updating apparatus, a position estimating method, and a computer-readable storage medium.

BACKGROUND

A position estimating technique has been proposed in which a mobile terminal such as a mobile phone, which is an example of a terminal apparatus, makes wireless communications with a plurality of base stations, and estimates a location of the mobile terminal by utilizing attenuation of received signal strengths depending on a distance to the mobile terminal from each of the plurality of base stations. For example, the base station may be an AP (Access Point) used in WiFi (Wireless Fidelity, registered trademark).

According to such a position estimating technique, the mobile terminal collects, in advance, IDs (Identifiers) of the plurality of base stations and RSSIs (Received Signal Strength Indicators) received at each location. From the IDs of the plurality of base stations and values of the RSSIs received at each location, an RSSI feature vector that is uniquely determined for each location is created, and a location model is created for each location using the RSSI feature vector. The location model may make a reference to a database indicating the location where the signals are received from the base stations, the base stations from which the signals are received by the mobile terminal at the location, and the RSSIs of the signals received by the mobile terminal at the location. When estimating the location, the RSSIs of the signals received by the mobile terminal from the base stations are collated with the location model, in order to estimate the location of the mobile terminal. Generally, the location model may be created by methods such as the k-NN (k-Nearest Neighbor algorithm) method, probability method based on probability distribution, non-parametric method, pattern matching method, or the like.

When the number of locations is large, the RSSI of the signal received from the base station by the mobile terminal needs to be collated with a large number of location models. A large storage capacity must be secured in order to store the large number of location models in the mobile terminal, because an amount of information of each location model is relatively later. However, the storage capacity of the mobile terminal is limited, and in some cases, a sufficiently large storage capacity cannot be secured to store the large number of location models. Hence, it is conceivable to simply decimate the large number of location models with which the RSSI of the signal received from the base station by the mobile terminal needs to be collated. But since it is impossible to know the location of the mobile terminal in advance, the position estimating accuracy deteriorates unless all of the location models are stored in the mobile terminal. On the other hand, although the position estimating accuracy can be maintained by securing the sufficiently large storage capacity to store all of the location models in the mobile terminal, a memory having the large storage capacity needs to be provided in the mobile terminal, and a cost of the mobile terminal increases due to the need to provide such a memory having the large storage capacity.

Conventionally, it is difficult to reduce the storage capacity for storing the location models, without sacrificing the position estimating accuracy.

Examples of the related art include Japanese Laid-Open Patent Publications No. 2012-145586 and No. 2013-053930.

SUMMARY

Embodiments may reduce a storage capacity for storing location models in a terminal apparatus, without sacrificing the position estimating accuracy.

According to one aspect of the present invention, a location model updating apparatus may include a storage unit, and a processor configured to generate attribute data in which an attribute of a location is represented by a location name and a data size of a location model, and an attribute between locations is represented by a similarity between the locations; extract a peripheral location by including each location from a current location of a terminal apparatus to a first front as a member of a definite peripheral location list, including each location from the first front to a second front as a member of a candidate peripheral location list, and updating each location that is a member of the definite peripheral location list and exists from the current location to the first front, and each location that is a member of the candidate peripheral location list and exists from the first front to the second front, using the current location of the terminal apparatus as a query; and transmit data of a peripheral location model of the peripheral location that is extracted, to the terminal apparatus, by including in the peripheral location model a flag identifying the peripheral location that is extracted as a location up to the first front.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a data structure of an all-region AP information list;

FIG. 5 is a diagram illustrating an example of a data structure of a location model;

FIG. 13 is a diagram for explaining an example of a similarity matrix;

FIG. 20 is a diagram illustrating an example of the place graph used by the peripheral location extracting process;

FIG. 21 is a diagram illustrating another example of the data structure of the location model;

DESCRIPTION OF EMBODIMENTS

Preferred embodiments of the present invention will be described with reference to the accompanying drawings.

A description will now be given of the location model updating apparatus, the position estimating method, and the computer-readable storage medium in each embodiment according to the present invention.

In one embodiment, the location model updating apparatus may generate attribute data in which an attribute of a location is represented by a location name and a data size of a location model, and an attribute between locations is represented by a similarity between the locations. The location model updating apparatus may extract a peripheral location by including each location from a current location of a terminal apparatus to a first front as a member of a definite peripheral location list, including each location from the first front to a second front as a member of a candidate peripheral location list, and updating each location that is a member of the definite peripheral location list and exists from the current location to the first front, and each location that is a member of the candidate peripheral location list and exists from the first front to the second front, using the current location of the terminal apparatus as a query. The location model updating apparatus may transmit data of a peripheral location model of the peripheral location that is extracted, to the terminal apparatus, by including in the peripheral location model a flag identifying the peripheral location that is extracted as a location up to the first front.

For example, the data of the peripheral location model, received by the terminal apparatus from the location model updating apparatus, may be difference data between the location model stored in the terminal apparatus and the peripheral location model extracted in the location model updating apparatus.

Figure 1:
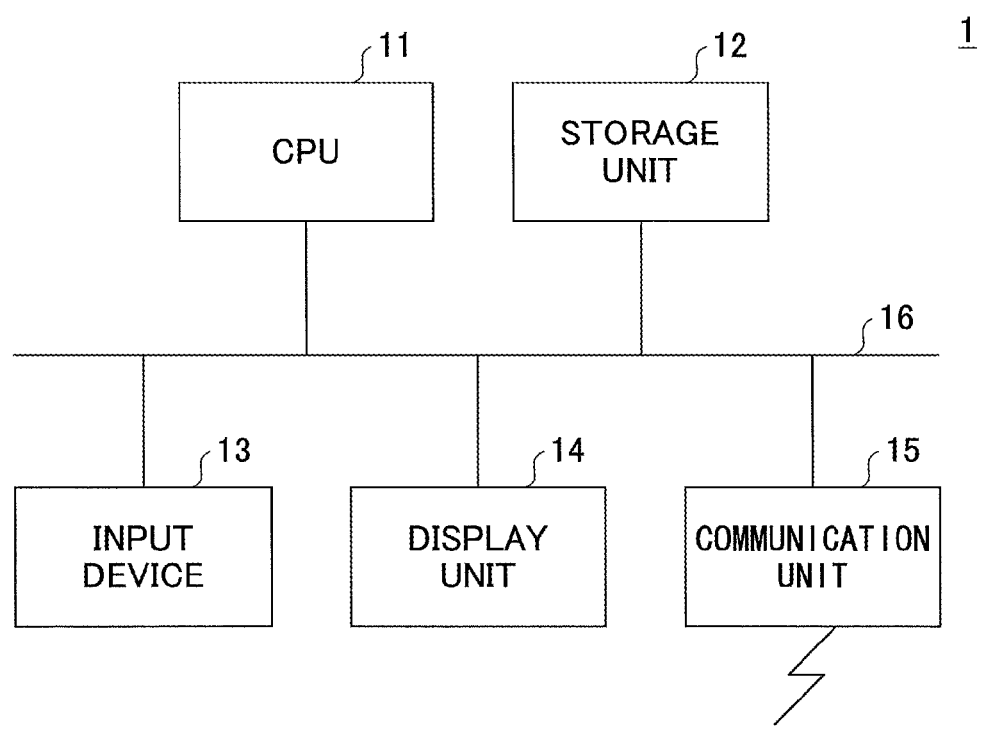
FIG. 1 is a block diagram illustrating an example of a configuration of a mobile terminal in one embodiment.

FIG. 1 is a block diagram illustrating an example of a configuration of a mobile terminal in one embodiment. A mobile terminal 1 illustrated in FIG. 1 is an example of a terminal apparatus provided with a communication function, which may be formed by a mobile phone such as a smart phone, for example. The mobile terminal 1 includes a CPU (Central Processing Unit) 11, a storage unit 12, an input device 13, a display unit 14, and a communication unit 15 that are connected via a bus 16. The mobile terminal 1 is not limited to the connection using the bus 16.

The CPU 11 is an example of a computer or processor. The CPU 11 controls the entire mobile terminal 1, and executes a position estimating process or the like to be described later, by executing one or more programs. The storage unit 12 stores one or more programs to be executed by the CPU 11, data to be used in computations performed by the CPU 11, or the like. The storage unit 12 may be formed by a non-transitory computer-readable storage medium. The non-transitory computer-readable storage medium may be formed by a semiconductor memory device. In a case in which the non-transitory computer-readable storage medium is formed by a recording medium such as a magnetic recording medium, an optical recording medium, a magneto-optical recording medium, or the like, the storage unit 12 may be formed by a reader and writer (or read and write unit) that reads information from and writes information to the recording medium that is loaded into the reader and writer.

The input device 13 may be formed by a keyboard or the like, and is operated by a user when inputting commands, data, or the like to the mobile terminal 1, for example. The display unit 14 may be formed by an LCD (Liquid Crystal Display) or the like, for example, and displays guidances, messages, or the like. The input device 13 and the display unit 14 may be formed integrally by a touchscreen panel, for example. The communication unit 15 has a wireless communication function capable of making wireless communication with an external apparatus (not illustrated), and has a known configuration including a receiver, a transmitter, an antenna, or the like. In this example, the communication unit 15 is communicable with an AP (Access Point) that uses WiFi, for example. The AP is an example of a base station.

Figure 2:
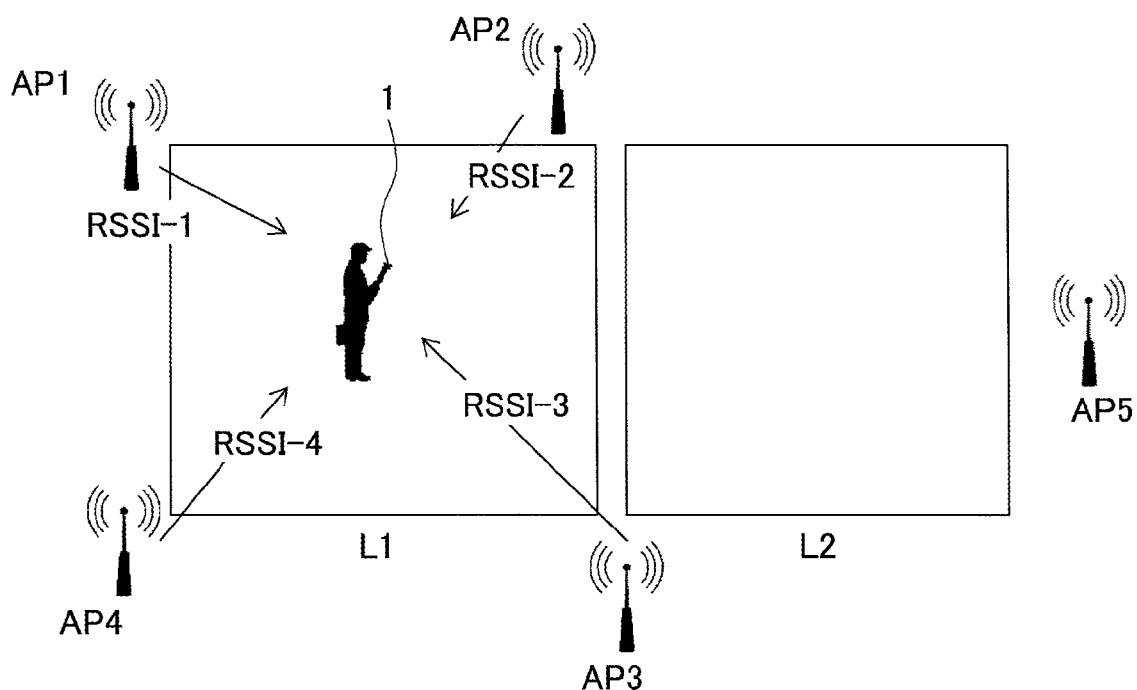
FIG. 2 is a diagram for explaining an example of a relationship of locations where a plurality of APs and a mobile terminal may exist.

FIG. 2 is a diagram for explaining an example of a relationship of locations where a plurality of APs and the mobile terminal may exist. In the example illustrated in FIG. 2, a plurality of APs, namely, APs AP1 through AP5, cover locations having location names L1 and L2, and the mobile terminal 1 carried by the user exists within the location having the location name L1. The RSSI at the mobile terminal 1 is RSSI-1 from the AP AP1, RSSI-1 from the AP AP2, RSSI-3 from the AP AP3, RSSI-4 from the AP AP4, and RSSI-5 from the AP AP5.

Figure 3:
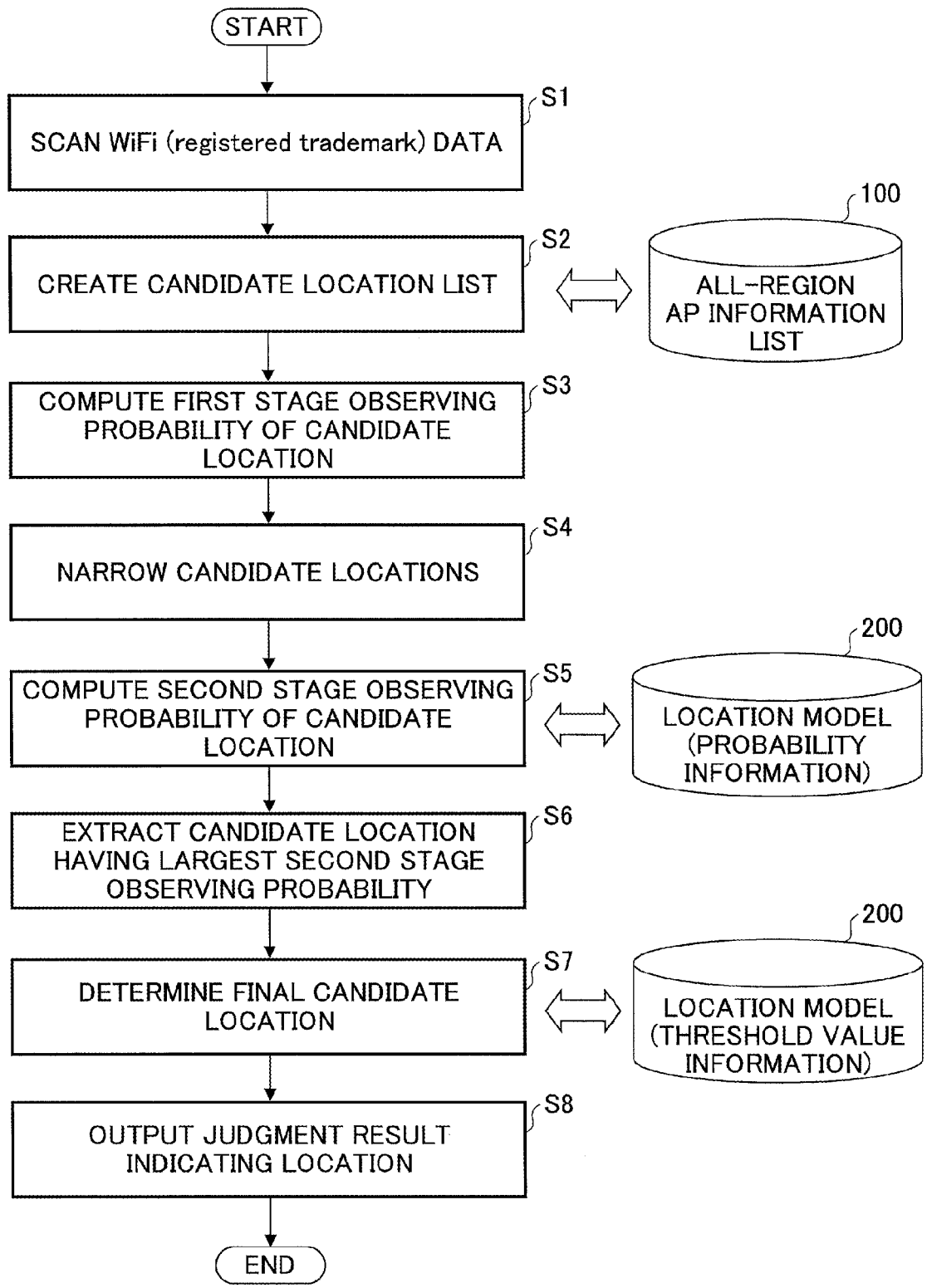
FIG. 3 is a flow chart for explaining an example of a position estimating process of the mobile terminal.

FIG. 3 is a flow chart for explaining an example of a position estimating process of the mobile terminal. The position estimating process illustrated in FIG. 3 may be executed by the CPU 11. In FIG. 3, the CPU 11 in step S1 scans WiFi data from each of the APs AP1 through AP5 to obtain WiFi scan data, acquires a MAC (Media Access Control) address of each of the APs AP1 through AP5 and the RSSIs from the WiFi scan data, and creates RSSI feature vectors. The CPU 11 in step S1 also refers to an all-region AP information list 100 stored in the storage unit 12, and excludes unlearned APs not included in the all-region AP information list 100.

FIG. 4 is a diagram illustrating an example of a data structure of the all-region AP information list. The all-region AP information list 100 illustrated in FIG. 4 includes, with respect to AP numbers 1, 2, . . . that are arbitrarily allocated to each of the APs, MAC addresses M1, M2, . . . of the APs, and an AP covering location list. The AP covering location list includes the location names L1, L2, L3, . . . of the locations.

As will be described below, the all-region AP information list 100 may be created based on the information acquired from the WiFi scan data. First, a blank all-region AP information list 100 is prepared. Thereafter, when the all-region AP information list 100 is searched and a check-in AP at a source of the WiFi scan data is new, the MAC address of the check-in AP is added to the all-region AP information list 100. At the same time, the location name that is checked in is added to a covering location list of this check-in AP. In a case in which the check-in AP is already stored in the all-region AP information list 100, the covering location list of this check-in AP is searched, and a check-in location name is added to the covering location list when the check-in location name is new.

In FIG. 3, the CPU 11 in step S2 refers to the all-region AP information list 100 to create a candidate location list of all coverage locations of the searched APs, as candidate locations, and stores the created candidate location list in the storage unit 12. The CPU 11 in step S2 also executes the following processes with respect to each AP APi. First, the CPU 11 performs a process to extract a coverage location list of each AP APi by referring to the all-region AP information list 100. Next, the CPU 11 performs a process to add all members (that is, all locations) of the coverage location list of each AP APi to the candidate location list, but this process is skipped when the member (that is, location) is already added to the candidate location list. Next, the CPU 11 makes a judgment to determine whether the process with respect to all APs APi is completed. When the judgment result is NO, the process of the CPU 11 returns to the process to extract the coverage location list, and the process advances to step S3 illustrated in FIG. 3 when the judgment result is YES.

In FIG. 3, the CPU 11 in step S3 computes a first stage observing probability of the AP that is the source of the WiFi scan data, with respect to each member (that is, each location) of the candidate location list. FIG. 5 is a diagram illustrating an example of a data structure of a location model. A location model 200 illustrated in FIG. 5 includes a location number, a location name, a threshold value of a second stage observing probability to be used within the location, and an observable AP list. The observable AP list includes a missing probability, observing probability, an observing probability for each strength level of the RSSI for a case in which the AP is observed, or the like, with respect to the MAC address. FIG. 5 illustrates a case in which the number of strength levels of the RSSI for the case in which the AP is observed is four (4), and a length of the observable AP list is three (3), for example. The location model 200 is stored in the storage unit 12, for example. Because the observable AP list includes a probability information part of the location model 200, the observable AP list in FIG. 3 is illustrated as a "location model (probability information)". On the other hand, because parts other than the observable AP list includes a threshold value information part of the second stage observing probability to be used at each location of the location model 200, the parts other than the observable AP list in FIG. 3 is illustrated as a "location model (threshold value information)".

The CPU 11 in step S3 performs the following processes for each AP APi, with respect to each candidate location. First, the CPU 11 searches the observable AP list of the candidate location in the location model 200 illustrated in FIG. 5, and acquires an observing probability that is learned in advance when the AP APi is included in the observable AP list. On the other hand, when the AP APi is not included in the observable AP list, the CPU 11 sets a relatively small constant that is set in advance, for example, as the observing probability of the AP APi. Next, the CPU 11 accumulates the observing probability of the AP APi to a product of the observing probability stored in the storage unit 12, and the CPU 11 makes a judgment to determine whether the process with respect to all APs APi is completed. When the judgment result is NO, the process of the CPU 11 returns to the process with respect to each AP APi, and when the judgment result is YES, the CPU 11 extracts the observable AP list of the candidate location of the location model 200 illustrated in FIG. 5.

Next, the CPU 11 performs the following processes with respect to each observable AP. First, the CPU 11 searches the WiFi scan data (AP1(MAC, RSSI, . . . )) to judge whether the observable AP is missing. When the MAC address of the observable AP is not included in the WiFi scan data, the CPU 11 judges that there is no missing observable AP, and the CPU 11 repeats the judgment to determine whether the observable AP is missing. On the other hand, when the CPU 11 judges that there is a missing observable AP, the CPU 11 extracts the missing probability of the missing observable AP from the location model 200, and the CPU 11 accumulates the missing probability to a product of the missing probability stored in the storage unit 12. When the process with respect to all observable APs is completed, the CPU 11 computes a product of the product of the observing probability and the product of the missing probability stored in the storage unit 12. The CPU 11 defines the computed product as the first stage observing probability of the candidate location, and the computed product is paired with the candidate location by the CPU 11 and stored in the storage unit 12. When the process with respect to all candidate locations is completed, the process of the CPU 11 advances to step S4 illustrated in FIG. 3.

In FIG. 3, the CPU 11 in step S4 discards the candidate locations having a low or low order first stage observing probability, in order to narrow the candidate locations. The CPU 11 in step S5 computes the second stage observing probability based on the RSSI feature vector, with respect to the narrowed candidate locations. A second stage observing probability computing process performs the computation with respect to the candidate location list that is narrowed in step S4 by the first stage observing probability computed in step S3.

The CPU 11 in step S5 performs the following processes for each AP APi, with respect to each candidate location. First, the CPU 11 refers to the location model 200, and when the MAC address of the AP APi is included in the observable AP list of the candidate location, the CPU 11 computes the strength level from the RSSI of the AP APi, and acquires from the location model 200 the observing probability for each strength level of the RSSI for the case in which the AP APi is observed. On the other hand, when the MAC address of the AP APi is not included in the observable AP list of the candidate location, the CPU 11 sets a relatively small constant that is set in advance, for example, as the observing probability for each strength level of the RSSI for the case in which the AP APi is observed. Next, the CPU 11 accumulates the observing probability for each strength level of the RSSI for the case in which the AP APi is observed to a product of the observing probability for each strength level stored in the storage unit 12, and the CPU 11 makes a judgment to determine whether the process with respect to all APs APi is completed. When the judgment result is NO, the process of the CPU 11 returns to the process with respect to each AP APi, and when the judgment result is YES, the CPU 11 computes a product of the product of the missing probability computed in step S3 and the product of the observing probability for each strength level, to store the computed product in the storage unit 12. Then, the CPU 11 defines the computed product as the second stage observing probability, and the computed product is paired with the candidate location by the CPU 11 and stored in the storage unit 12. When the process with respect to all candidate locations is completed, the process of the CPU 11 advances to step S6 illustrated in FIG. 3.

In FIG. 3, the CPU 11 in step S6 extracts (or selects) the candidate location having the largest second stage observing probability. The CPU 11 in step S7 refers to the location model 200 illustrated in FIG. 5, and determines a final candidate location by making a judgment using a threshold value of the candidate location having the largest second stage observing probability. When the second stage observing probability is less than the threshold value, the CPU 11 judges that the mobile terminal 1 is not located at a final candidate location and the location of the mobile terminal 1 is unknown. On the other hand, when the second stage observing probability is greater than or equal to the threshold value, the CPU 11 judges that the mobile terminal 1 is located at the final candidate location. The CPU 11 in step S8 outputs a judgment result indicating the location of the mobile terminal 1, or indicating that the location of the mobile terminal 1 is unknown, and the position estimating process ends. The judgment result output in step S8 may be output to application software or the like that provides services utilizing the position of the mobile terminal 1, for example.

By executing the processes of steps S1 through S5 corresponding to procedures of the position estimating method, the CPU 11 may function as a narrowing unit or means to narrow the candidate positions of the mobile terminal that are estimated from the signals received from the plurality of base stations, based on the missing data of the signal received from a certain base station. In addition, by executing the processes of steps S6 and S7 corresponding to procedures of the position estimating method, the CPU 11 may function as an estimating unit or means to estimate the position of the mobile terminal from the narrowed candidate positions, based on the observing probability of the strength of the signals received.

Figure 6:
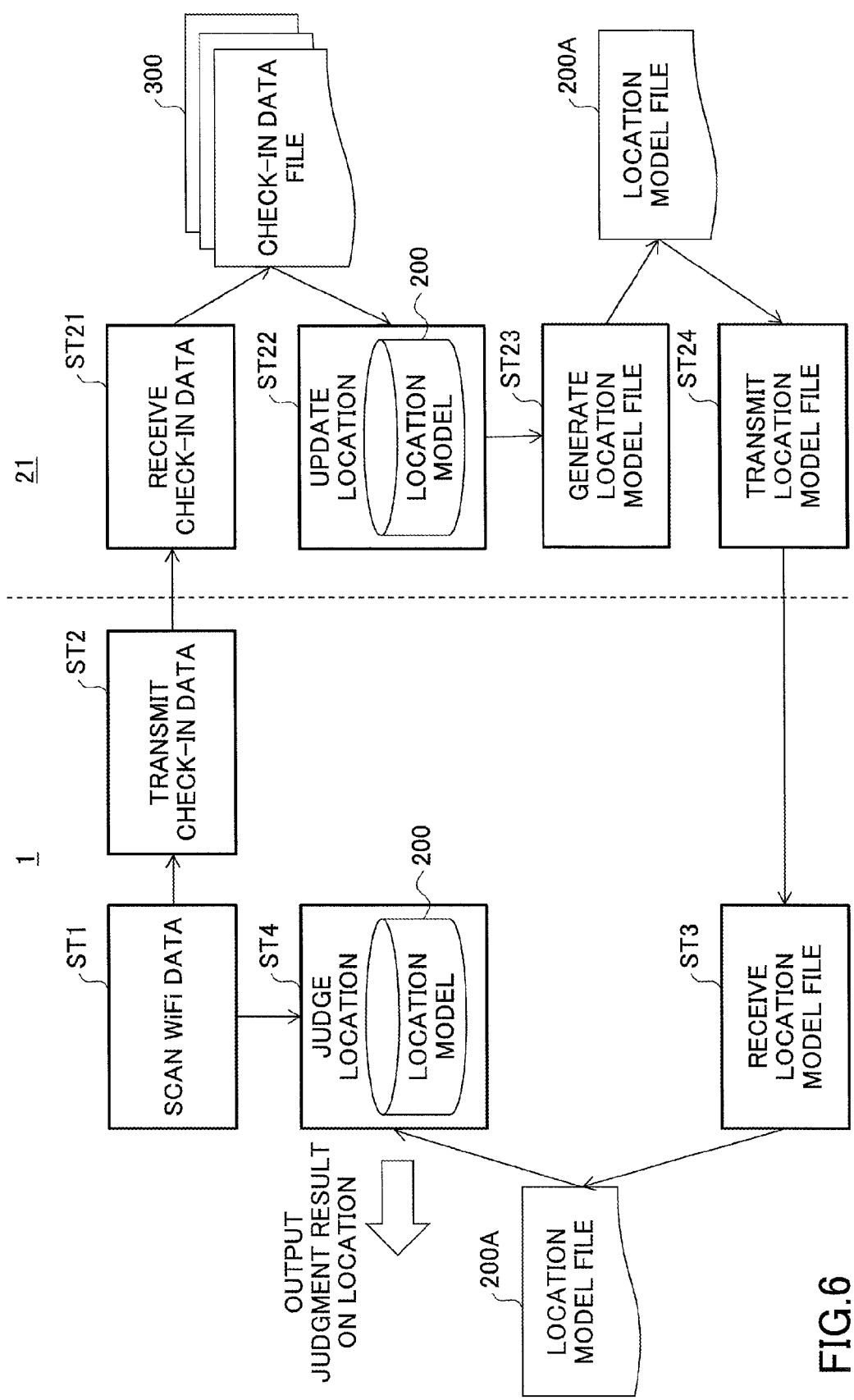
FIG. 6 is a diagram for explaining an example of an operation of a position estimating system in one embodiment.

Next, a description will be given of an example of a position estimating system in one embodiment, by referring to FIG. 6. FIG. 6 is a diagram for explaining an example of an operation of the position estimating system in one embodiment. A position estimating system 20 illustrated in FIG. 6 includes a mobile terminal 1, and a server 21 communicable with the mobile terminal 1 by wireless communication. The server 21 has a function to learn (hereinafter also referred to as "update") the location model 200, using data (hereinafter also referred to as "check-in data") checked in from the mobile terminal 1. The mobile terminal 1 performs the position estimating process based on RSSI feature vectors that are newly observed, using the location model 200 downloaded from the server 21. The server 21 has a known configuration including a processor and a storage unit, and may have a hardware configuration similar to that of the mobile terminal 1 illustrated in FIG. 1, for example. For this reason, illustration and description of the hardware configuration of the server 21 will be omitted. In this example, the server 21 functions as an example of a location data updating apparatus.

In step ST1 illustrated in FIG. 6, the processor (for example, CPU 11) of the mobile terminal 1 acquires the check-in data by acquiring the MAC address and the RSSI of each AP from the WiFi scan data. In step ST2, the processor of the mobile terminal 1 transmits the check-in data to the server 21.

In step ST21, the processor (corresponding to CPU 11 illustrated in FIG. 1, for example) of the server 21 receives the check-in data from the mobile terminal 1, and stores the check-in data in a check-in data file 300 within the storage unit (corresponding to the storage unit 12 illustrated in FIG. 1, for example) of the server 21. In step ST22, the processor of the server 21 reads the check-in data file 300 from the storage unit of the server 21, and executes the updating process to update the location model 200.

The updating process to update the location model 200 may include updating the probability information part of the location model 200, updating the threshold value information part of the location model, or the like. Updating the probability information part updates the location model (probability information) corresponding to the probability information part of the location model 200, using the check-in data. Thereafter, when computing the second stage observing probability, the process of a second stage of the location estimation is performed with respect to the check-in data, based on the location model (probability information). The second stage observing probability and the location name of the check-in location, obtained by the process of the second stage of the location estimation, are used to compute the threshold value of the second stage observing probability, that is, the threshold value at each check-in location, in order to update the location model (threshold value information) corresponding to the threshold value information part of the location model 200. The updating process to update the location model 200 is completed after the probability information part and the threshold value information part of the location model 200 are updated.

In step ST23, the processor of the server 21 generates a file (hereinafter also referred to as a "location model file") 200A of the updated location model 200, and stores the location model file 200A in the storage unit of the server 21. In step ST24, the processor of the server 21 reads the location model file 200A from the storage unit of the server 21, and transmits the location model file 200A to the mobile terminal 1.

In step ST3, the process of the mobile terminal 1 receives the location model file 200A from the server 21, and stores the location model file 200A in the storage unit 12 of the mobile terminal 1. In other words, the mobile terminal 1 stores the location model file 200A in the storage unit 12 and updates the location model 200 every time a new location model file 200A is generated in the server 21. In step ST4, the processor of the mobile terminal 1 reads the location model file 200A from the storage unit 12, to perform the position estimating process based on the RSSI feature vectors of the check-in data, using the location model 200, and outputs a judgment result on the location of the mobile terminal 1.

Figure 7:
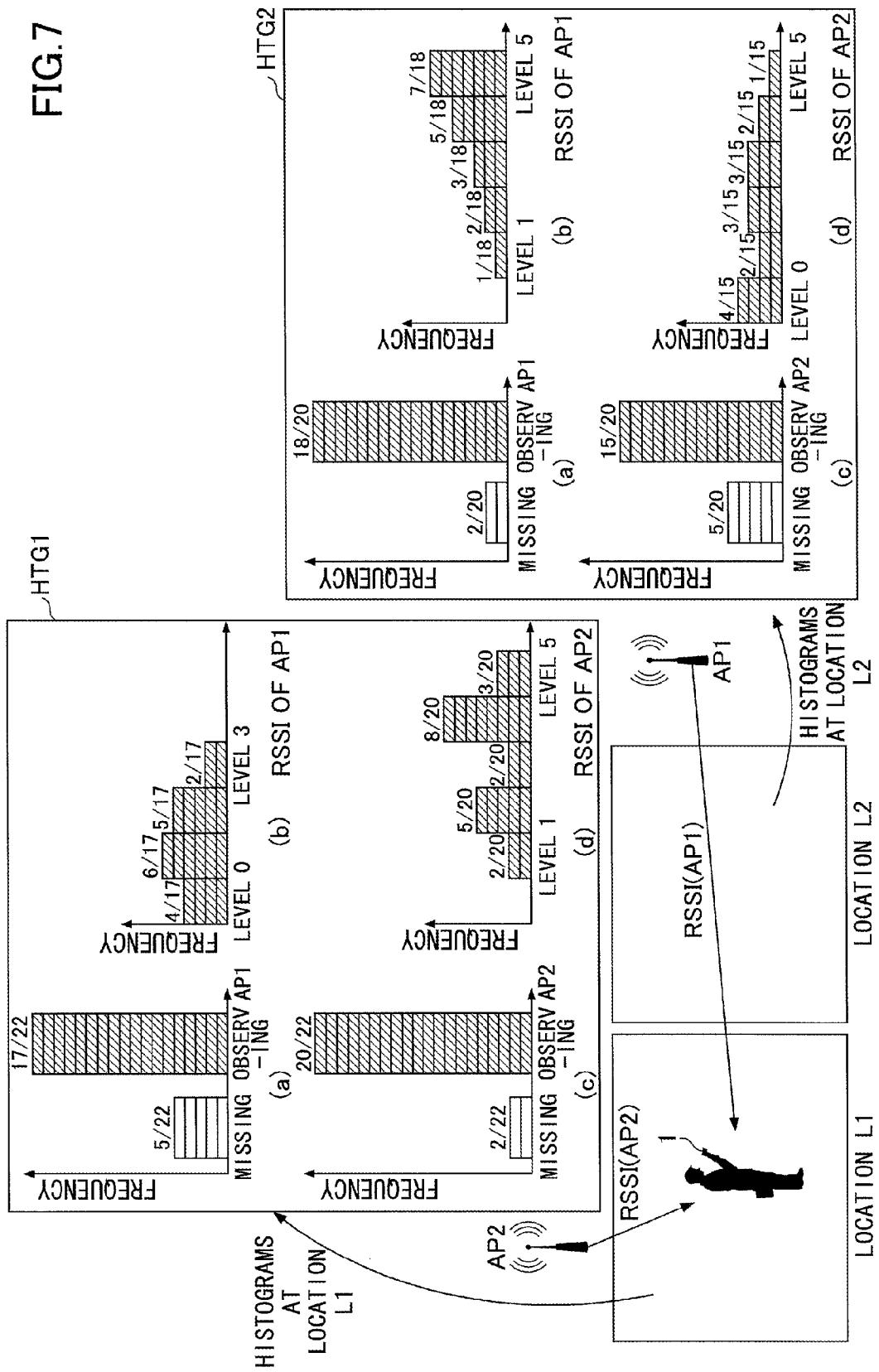
FIG. 7 is a diagram for explaining an example of the location model.

FIG. 7 is a diagram for explaining an example of the location model. FIG. 7 illustrates the AP observing and missing probabilities, and the observing probability for each RSSI level. In HTG1 of FIG. 7, (a) illustrates missing and observing histograms for an example in which, amongst 22 learning samples (check-in data) collected at a location having a location name L1, 5 samples are the samples missing observation of the AP AP1, and 17 samples are the samples of observation of the AP AP1. In this case, at the location having the location name L1, the missing probability of the AP AP1 is 5/22=0.227, and the observing probability of the AP AP1 is 17/22=0.773. In addition, in HTG1 of FIG. 7, (b) illustrates an RSSI histogram in which, amongst 17 samples of the AP AP1 observed, 4 samples have the RSSI level 0, 6 samples have the RSSI level 1, 5 samples have the RSSI level 2, and 2 samples have the RSSI level 3. Accordingly, when the AP AP1 is observed at the location having the location name L1, the observing probability for the RSSI levels 0, 1, 2, and 3 are 4/17=0.235, 6/17=0.353, 5/17=0.294, and 2/17=0.118, respectively. Similarly, in HTG1 of FIG. 7, (c) illustrates missing and observing histograms for an example in which, at the location having the location name L1, the missing probability of the AP AP2 is 2/22=0.091, and the observing probability of the AP AP2 is 20/22=0.909. Further, in HTG1 of FIG. 7, (d) illustrates an RSSI histogram in which, when the AP AP2 is observed at the location having the location name L1, the observing probability for the RSSI levels 1, 2, 3, 4, and 5 are 2/20=0.100, 5/20=0.250, 2/20=0.100, 8/20=0.400, and 3/20=0.150, respectively.

In HTG2 of FIG. 7, (a) illustrates missing and observing histograms for an example in which, amongst 20 learning samples (check-in data) collected at a location having a location name L2, 2 samples are the samples missing observation of the AP AP1, and 18 samples are the samples of observation of the AP AP1. In this case, at the location having the location name L2, the missing probability of the AP AP1 is 2/20=0.100, and the observing probability of the AP AP1 is 18/20=0.900. In addition, in HTG2 of FIG. 7, (b) illustrates an RSSI histogram in which, amongst 18 samples of the AP AP1 observed, 1 sample has the RSSI level 1, 2 samples have the RSSI level 2, 3 samples have the RSSI level 3, 5 samples have the RSSI level 4, and 7 samples have the RSSI level 5. Similarly, in HTG2 of FIG. 7, (c) illustrates missing and observing histograms for an example in which, at the location having the location name L2, the missing probability of the AP AP2 is 5/20=0.250, and the observing probability of the AP AP2 is 15/20=0.750. Further, in HTG2 of FIG. 7, (d) illustrates an RSSI histogram in which, when the AP AP2 is observed at the location having the location name L2, the observing probability for the RSSI levels 0, 1, 2, 3, 4, and 5 are 4/15=0.267, 2/15=0.133, 3/15=0.200, 3/15=0.200, 2/15=0.133, and 1/15=0.067, respectively.

In HTG1 and HTG2 of FIG. 7, the ordinates in (a) and (c) indicate the missing frequency and the observing frequency of the data observation, and the abscissas in (a) and (c) indicate the observation missing state or the observing state of the APs AP1 and AP2, respectively. In addition, in HTG1 and HTG2 of FIG. 7, the ordinates in (b) and (d) indicate the observing frequency, and the abscissas in (b) and (d) indicate the RSSI level of the APs AP1 and AP2, respectively.

The likelihood of the candidate position can be computed from [Likelihood]=[Probability of Observing RSSI Level]×[Probability of Missing Observation of AP]. For example, in a case in which the RSSI obtained by scanning the AP AP1 has the RSSI level 1, the likelihood of the location having the location name L1 is [Probability of Observing RSSI Level 1 of AP AP1]×[Probability of Missing observation of AP AP2]=[6/17]×[2/22]=0.032. In addition, in a case in which the RSSI obtained by scanning the AP AP1 has the RSSI level 1 and the RSSI obtained by scanning the AP AP2 has the RSSI level 4, for example, the likelihood of the location having the location name L1 can be computed from [Probability of Observing RSSI Level 1 of AP AP1]×[Probability of Observing RSSI level 4 of AP AP2]=[6/17]×[8/20]=0.141.

An operator of the position estimating system may create in advance an initial location model based on RSSI samples collected from a predetermined number of locations. In this case, the position estimating accuracy can be improved by updating the initial location model based on the samples from the mobile terminal, at the time of updating the location model or during the position detection.

When the number of locations is large, the amount of information of the location model, that is, the data size, becomes large. However, when the number of location models to be collated with the RSSI of the signal received from the base station by the mobile terminal is simply decimated, the position estimating accuracy deteriorates since it is impossible to know the location of the mobile terminal in advance. The deterioration of the position estimating accuracy caused by the decimation of the number of location models to be collated occurs because the location model does not include a spatial relationship between the adjacent locations, and it is difficult to appropriately extract the location models to be collated at a current location of the mobile terminal from the large number of location models. Hence, the present inventor conceived a technique to reduce a storage capacity for storing the location models in the mobile terminal (or terminal apparatus), without sacrificing the position estimating accuracy, by obtaining the spatial relationship between the adjacent locations in a relatively simple manner and by extracting the location models to be used for the collation at the current location of the mobile terminal based on the spatial relationship.

Generally, the spatial relationship between the adjacent locations is unknown. However, in an environment of a general system in which the APs are arranged, it may be regarded that distributions of the RSSIs are similar between the adjacent locations. For example, between two mutually adjacent locations, the mobile terminal receives the signals from approximately the same APs, and thus, distributions of the RSSIs are similar. On the other hand, between two locations that are distant from each other, the mobile terminal receives the signals from different APs, and thus, the distributions of the RSSIs are different. Hence, by effectively utilizing these features, the spatial relationship between the adjacent locations is obtained from an observing state and an observation missing state of the signals from the APs, and the RSSI of the signals, at each of the adjacent locations.

More particularly, a place graph is generated at the server, using the current location of the mobile terminal as a query. This place graph represents an attribute of the location, and similarities of features between the adjacent locations, where the features include features related to frequencies of the observing state and the observation missing state of the signals from the APs, and features related to the RSSI of the signals. In other words, in the place graph, the attribute of the location is represented by the location name and the data size of the location model, and the attribute between the locations is represented by the similarities between the locations. The location models of peripheral locations to be used for the collation at the current location of the mobile terminal are extracted at the server based on the place graph, and the extracted location models are transmitted to the mobile terminal in order to update the location models stored within the mobile terminal to be used for the collation. Because only the location models to be used for the collation need to be stored and updated at the mobile terminal, the data size to be stored at the mobile terminal can be reduced even when the number of locations becomes large, and it is possible to reduce the storage capacity for storing the location models in the mobile terminal, without sacrificing the position estimating accuracy. In addition, because the data size to be stored at the mobile terminal can be reduced, it is unnecessary to provide a memory having a large storage capacity in the mobile terminal, to thereby enable reduction in the cost of the mobile terminal. Accordingly, even when the mobile terminal moves, it is possible to automatically update the peripheral location models to be used by the mobile terminal for the position estimation.

Figure 8:
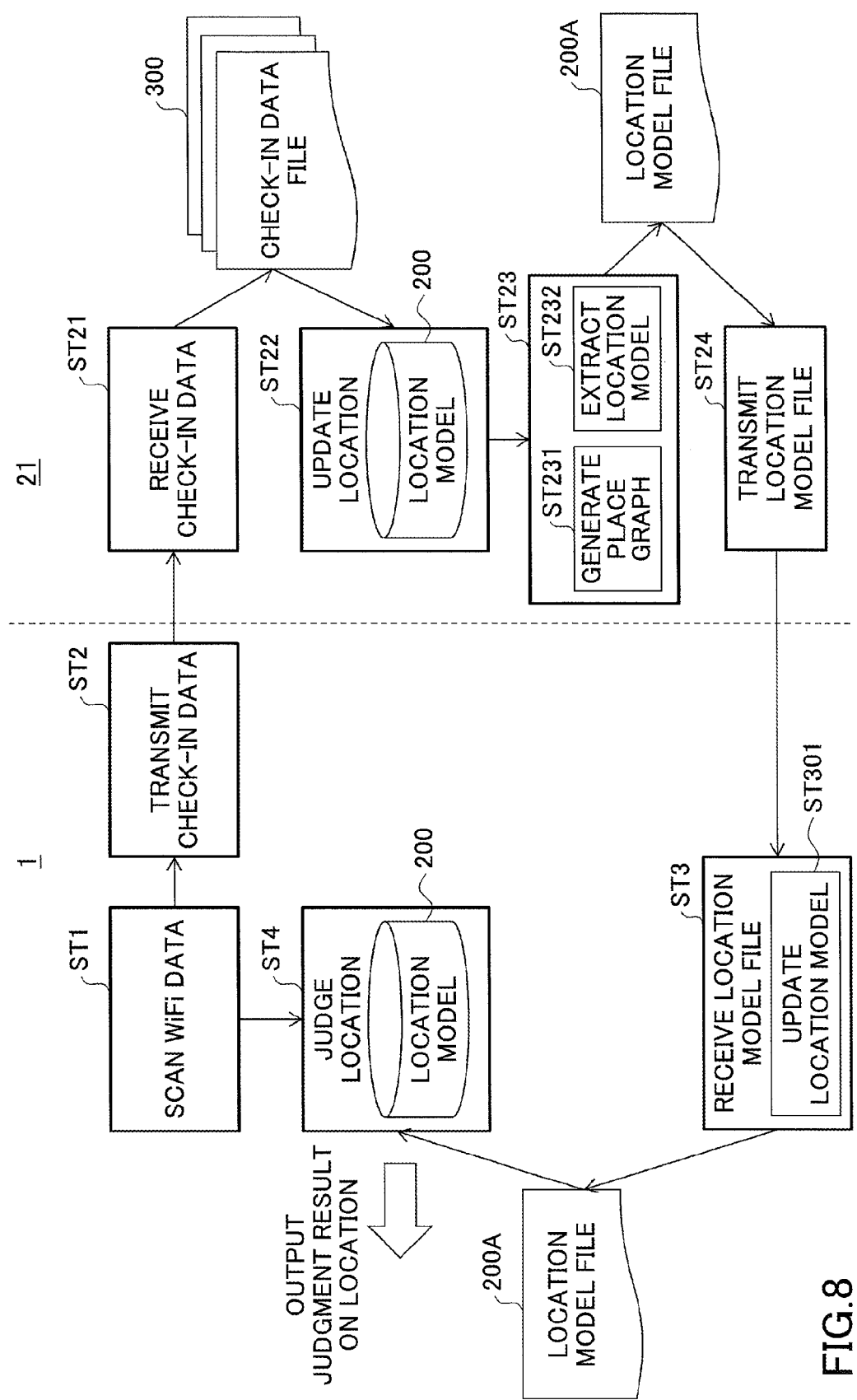
FIG. 8 is a block diagram illustrating in more detail a configuration of an example of the position estimating system applied with a technique conceived by the present inventor.

FIG. 8 is a block diagram illustrating in more detail a configuration of an example of the position estimating system applied with the technique conceived by the present inventor. In FIG. 8, those parts that are the same as those corresponding parts in FIG. 6 are designated by the same reference numerals, and a description thereof will be omitted.

Step ST23 illustrated in FIG. 8, which is executed by the processor (corresponding to CPU 11 illustrated in FIG. 1, for example) of the server 21, includes steps ST231 and ST232. In step ST231, the processor of the server 21 executes a place graph generating process to generate the place graph which will be described later, based on the check-in data and the location model. In step ST232, the processor of the server 21 executes a location model extracting process to extract the location models of the peripheral locations, located in the periphery of the current location of the mobile terminal 1, based on the place graph read from the storage unit of the server 21. The place graph may be stored in the location model file 200A. In step ST24, the processor of the server 21 executes a transmitting process to transmit the location models of the peripheral locations, located in the periphery of the current location of the mobile terminal 1 and extracted by the location model extracting process of step ST232, to the mobile terminal 1. On the other hand, in step ST3, the CPU 11 of the mobile terminal 1 receives the location models of the peripheral locations, located in the periphery of the current location of the mobile terminal 1 and extracted and transmitted by the server 21. In step ST301 included in step ST3, the CPU 11 of the mobile terminal 1 updates the location models stored in the storage unit 12, based on the location models received from the server 21 in step ST3. In other words, every time the location model at the peripheral location located in the periphery of the current location of the mobile terminal 1 is extracted at the server 21, the mobile terminal 1 updates the location model file 200A stored in the storage unit 12 based on the location model downloaded from the server 21. In step ST4, the CPU 11 of the mobile terminal 1 reads the updated location model file 200A from the storage unit 12, and performs a position estimating process based on the RSSI feature vector of the check-in data, using the updated location model 200, in order to output a judgment result on the location of the mobile terminal 1. In step ST4, the CPU 11 of the mobile terminal 1 collates the RSSI data obtained by the WiFi scan (step ST1) with the updated location model of the peripheral location, in order to detect the current location and estimate the current position of the mobile terminal 1.

The processor of the server 21 may function as a generating unit or means to execute the place graph generating process of step ST231, and may function as an extracting unit or means to execute the location model extracting process of step ST232. In addition, the processor of the server 21 may function as a transmitting unit or means to execute the transmitting process of step ST24.

In the example illustrated in FIG. 8, the sending of the check-in data from the mobile terminal (step ST2) may form a download request requesting the location model of the peripheral location with respect to the server 21. In this case, when the server 21 accepts the download request, the server 21 executes, in addition to the processes of steps ST21 and ST22, the place graph generating process and the location model extracting process of steps ST231 and ST232, in order to extract the location model of the peripheral location in the periphery of the current location of the mobile terminal 1 and transmit the extracted location model to the mobile terminal 1 by the transmitting process of step ST24.

In step ST301, the CPU 11 of the mobile terminal 1 may transmit download requests, such as a location model update request that requests updating of the location model and a location model request that requests the location model of the peripheral location, with respect to the server 21. In this case, when the processor of the server 21 accepts the download request in step ST24, the processor of the server 21 executes the place graph generating process and the location model extracting process in steps ST231 and ST232 of step ST23, and executes the transmitting process of step ST24 in order to transmit the extracted location model to the mobile terminal 1. Hence, in step ST301, the CPU 11 of the mobile terminal 1 can download the extracted location model of the peripheral location from the server 21.

Figure 9:
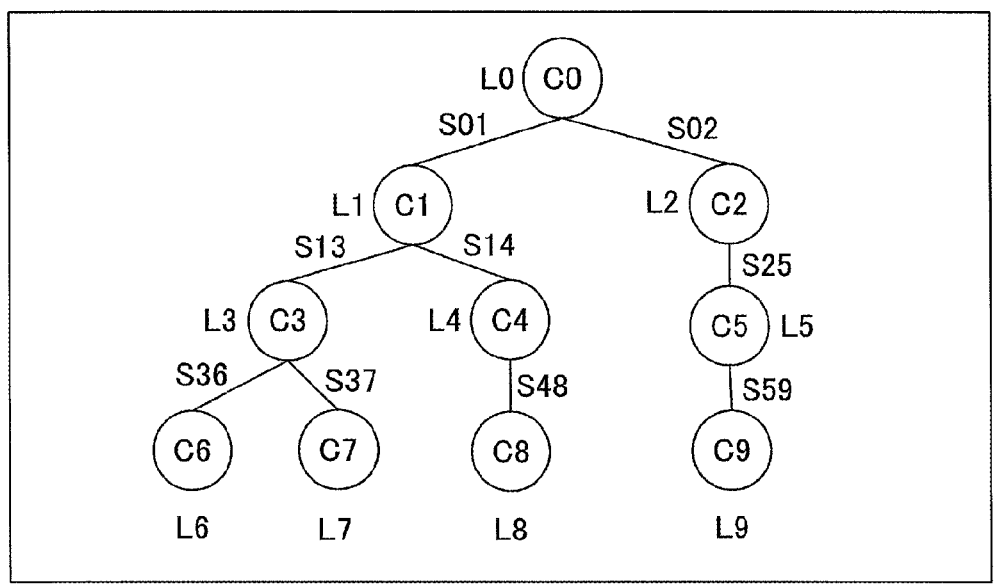
FIG. 9 is a diagram for explaining an example of a place graph.

Next, a description will be given of the place graph generating process of step ST231, by referring to FIG. 9. FIG. 9 is a diagram for explaining an example of the place graph. In FIG. 9, a circular mark represents a location node of the place graph representing the locations. Each location name holds information such as the location name, the data size of histogram, or the like. For example, C0 represents data indicating the data size of the RSSI histogram at the location L1. The data C0, C1, . . . have values determined by the number of APs observed at the respective locations, and a unit of the data C0, C1, . . . is byte, for example. In addition, in FIG. 9, a line connecting adjacent circular marks represents a link connecting the adjacent location nodes. The link represents a similarity, between RSSI distribution features including the observing state and the observation missing state of the signals from the APs and the RSSI of the signals at one of the adjacent locations, and RSSI distribution features including the observing state and the observation missing state of the signals from the APs and the RSSI of signals at the other of the adjacent locations, which is an example of the spatial relationship between the adjacent locations. For example, a value S01 of the link represents data indicating the similarity of the RSSI distribution features between the adjacent locations L0 and L1, and can be computed by a method which will be described later.

For example, the similarity of the RSSI distribution features between the locations L0 and L1 may be obtained by computing first and second likelihood differences as will be described hereinafter, and computing a distribution distance between the first and second likelihood differences.

Figure 10:
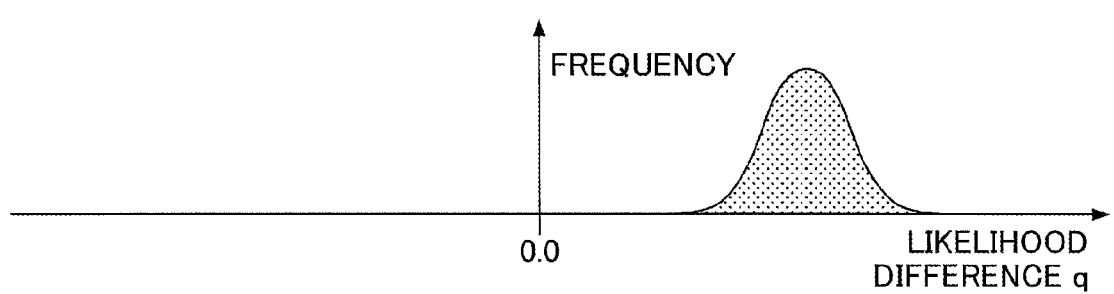
FIG. 10 is a diagram illustrating an example of a distribution of first likelihood difference values.

Fist, the first likelihood difference may be computed as follows. That is, a difference $q(a1)=p(a1|L1)-p(a1|L2)$, $q(a2)=p(a2|L1)-p(a2|L2)$ between a likelihood $p(a1|L1)$, $p(a2|L1)$ of samples [a1(xx, . . . ), L1], [a2(xx, . . . ), L1] collected at the location L1 as data observed at the location L1, and a likelihood $p(a1|L2)$, $p(a2|L2)$ of the samples [a1(xx, . . . ), L1], [a2(xx, . . . ), L1] collected at the location L1 as data observed at the location L2, is computed. FIG. 10 is a diagram illustrating an example of a distribution of first likelihood difference values, where the ordinate indicates the frequency in arbitrary units, and the abscissa indicates the first likelihood difference in arbitrary units. In a case in which the locations L1 and L2 are spatially close to each other, the respective likelihood values q are close to each other, and the first likelihood difference value is close to 0.0. On the other hand, in a case in which the locations L1 and L2 are spatially distant from each other, the likelihood value q observed at the location L1 is large compared to the likelihood value q observed at the location L2, and the first likelihood difference value becomes greater than 0.0.

Figure 11:
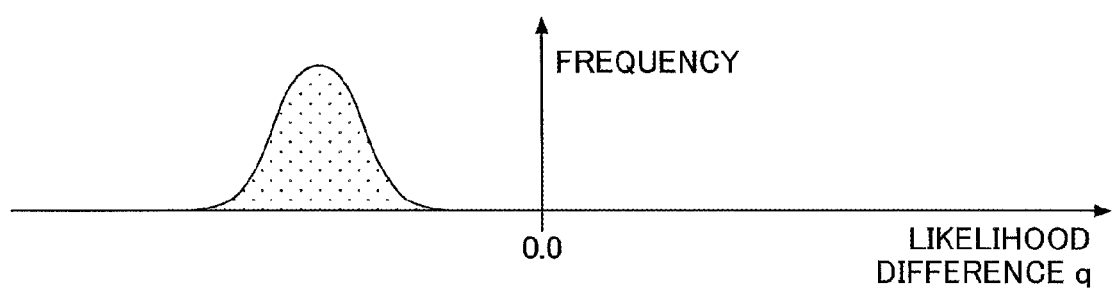
FIG. 11 is a diagram illustrating an example of a distribution of second likelihood difference values.

Next, the second likelihood difference may be computed as follows. That is, a difference $q(b1)=p(b1|L1)-p(b1|L2)$, $q(b2)=p(b2|L1)-p(b2|L2)$ between a likelihood $p(b1|L1)$, $p(b2|L1)$ of samples [b1(xx, . . . ), L2], [b2(xx, . . . ), L2] collected at the location L2 as data observed at the location L1, and a likelihood $p(b1|L2)$, $p(b2|L2)$ of the samples [b1(xx, . . . ), L2], [b2(xx, . . . ), L2] collected at the location L2 as data observed at the location L2, is computed. FIG. 11 is a diagram illustrating an example of a distribution of second likelihood difference values, where the ordinate indicates the frequency in arbitrary units, and the abscissa indicates the second likelihood difference in arbitrary units. In a case in which the locations L1 and L2 are spatially close to each other, the respective likelihood values q are close to each other, and the second likelihood difference value is close to 0.0. On the other hand, in a case in which the locations L1 and L2 are spatially distant from each other, the likelihood value q observed at the location L2 is large compared to the likelihood value q observed at the location L1, and the second likelihood difference value becomes greater than 0.0.

Figure 12:
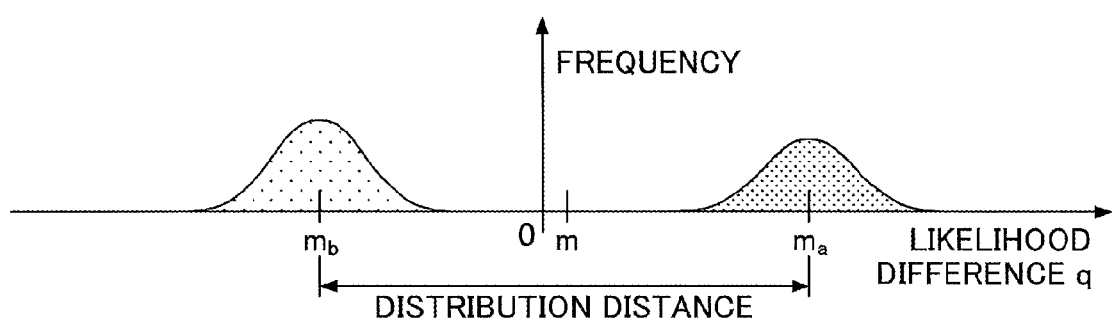
FIG. 12 is a diagram illustrating an example of a distribution distance between the first and second likelihood differences.

Next, a distribution distance between the first and second likelihood differences is computed. FIG. 12 is a diagram illustrating an example of the distribution distance between the first and second likelihood differences. In this example, the distribution distance between the first and second likelihood differences is represented by a likelihood difference variance ratio.

The likelihood difference variance includes a likelihood difference variance within the likelihood difference type, and a likelihood difference variance between the likelihood difference types. The likelihood difference variance within the likelihood difference type may be obtained from an average value of a variance of the first likelihood difference and a variance of the second likelihood difference, as represented by the following formula. In the following formulas, $N_A$ denotes a number of samples collected at the location L1, $N_B$ denotes a number of samples collected at the location L2, $a_i$ denotes an ith sample collected at the location L1, $b_j$ denotes a jth sample collected at the location L2, $q(a_i)$ denotes the first likelihood difference computed from the sample $a_i$, $q(b_j)$ denotes the second likelihood difference computed from the sample $b_j$, $m_\alpha$ denotes an average value of the first likelihood difference, $m_b$ denotes an average value of the second likelihood difference, and m denotes an average of the first likelihood difference and the second likelihood difference.

$$\sigma_w^2 = \frac{1}{N_A + N_B}\left(\sum_{i=0}^{N_A}(q(a_i) - m_a)^2 + \sum_{j=0}^{N_B}(q(b_j) - m_b)^2\right)$$

The likelihood difference variance between the likelihood difference types may be obtained from the average of the first likelihood difference and the average of the second likelihood difference, as represented by the following formula.

$$\sigma_b^2 \{(1/(N_A+N_B))\}\{N_A(M_\alpha-m)^2+N_B(m_b-m)^2\}$$

Furthermore, a likelihood difference variance ratio may be obtained based on the following formula.

$$J_\rho = \sigma_b^2/\sigma_w^2$$

Accordingly, a similarity $S_{1,2}$ of the RSSI distribution features between the locations L0 and L1, represented by a value S01 of the link, may be obtained based on the following formula.

$$S_{1,2} = J\rho$$

The method of computing the likelihood is not limited to the computing method described above, and other known computing methods may be used. For example, instead of representing the RSSI distribution by a histogram, the RSSI distribution may be represented by a Gaussian distribution using the average variance.

FIG. 13 is a diagram for explaining an example of a similarity matrix. The place graph may be generated by computing the similarity matrix indicating a similarity between the locations, for example, representing the locations by the location nodes in the place graph, and linking the location nodes of the locations having similarities that are not zero (0). Because the similarity matrix is symmetrical as illustrated in FIG. 13, it is sufficient to compute only the similarities (that is, the values of the links) in an upper right half or a lower left half with respect to a diagonal line extending from the upper left to the lower right of the similarity matrix. However, in a case in which no AP is shared between the two locations, the similarity is not computed, and instead, a zero (0) entry is made into a corresponding cell of the similarity matrix. As a result, it is possible to generate the place graph illustrated in FIG. 9, for example.

The place graph may be a graph, a table, a tree, or the like representing the features of the locations and the similarities of the locations. The place graph is not limited to a graph, as long as the place graph includes attribute data in which the attribute of the location is represented by the location name and the data size of the location model, and the attribute between the locations is represented by the similarity between the locations.

Figure 14:
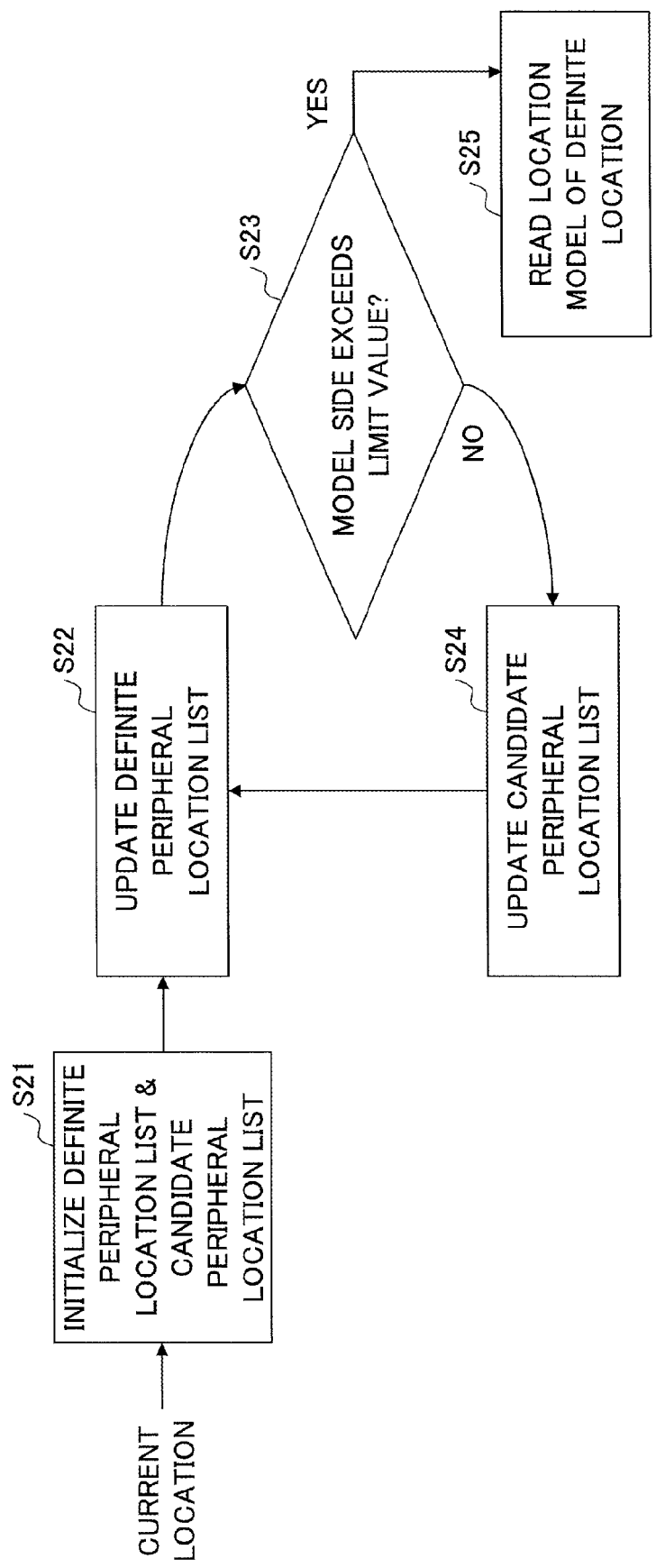
FIG. 14 is a flow chart for explaining an example of an updating process to update a definite peripheral location list and a candidate peripheral location list.

Next, a description will be given of the location model extracting process of step ST232, by referring to FIGS. 14 and 15. FIG. 14 is a flow chart for explaining an example of an updating process to update a definite peripheral location list and a candidate peripheral location list.

Figure 15:
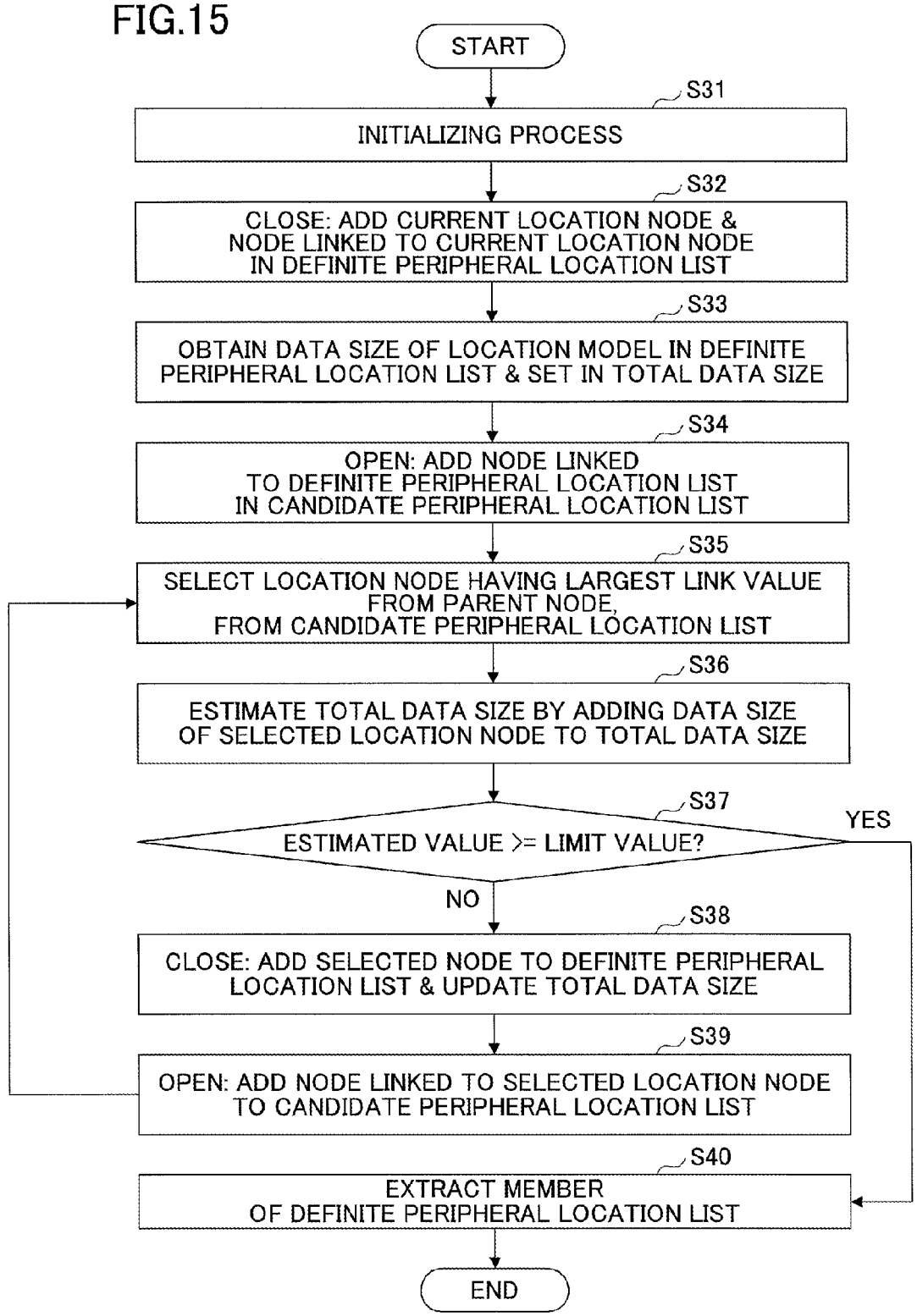
FIG. 15 is a flow chart for explaining in more detail an example of a peripheral location extracting process.

In step S21 illustrated in FIG. 15, the processor of the server 21 prepares a definite peripheral location list and a candidate peripheral location list, and initializes these lists that are stored in the storage unit of the server 21, for example. The definite peripheral location list stores, as definite peripheral locations, the current location and the locations linked to the current location. In addition, the candidate peripheral location list stores, as candidate peripheral locations, indefinite locations linked to the definite peripheral locations. In step S22, the processor of the server 21 updates the definite peripheral location list. The updating of the definite peripheral location list includes extracting, from the candidate peripheral location list, a location having a highest similarity to the definite peripheral location, and storing, as the definite peripheral location, the location having the highest similarity in the definite peripheral location list.

In step S23, the processor of the server 21 judges whether a total of the model sizes of the location models of the definite peripheral locations exceeds a limit value, and the process advances to step S24 when the judgment result is NO, and the process advances to step S25 when the judgment result is YES. In step S24, the processor of the server 21 updates the candidate peripheral location list. The updating of the candidate peripheral location list includes storing, as the candidate peripheral location, the location (or candidate location) that is not stored in both the candidate peripheral location list and the definite peripheral location list at a link destination of the peripheral location that currently became definite. Accordingly, the updating of the definite peripheral location list and the updating of the candidate peripheral location list are repeated until the total of the model sizes of the location models of the definite peripheral locations reaches the limit value. In step S25, the processor of the server 21 reads the location model of the definite location from the storage unit of the server 21.

FIG. 15 is a flow chart for explaining in more detail an example of a peripheral location extracting process. In step S31 illustrated in FIG. 15, the processor of the server 21 performs an initializing process. This initializing process clears the definite peripheral location list that stores the definite locations, clears the candidate peripheral location list that stores the candidate locations, and sets a total data size of the location models at the peripheral locations (hereinafter also referred to as "peripheral location models") to zero (0).

In step S32, the processor of the server 21 performs a close process, which is an example of a first process. This close process adds to the definite peripheral location list a location node of the current location of the mobile terminal (hereinafter also referred to as a "current location node"), and location nodes linked to the current location node. In step S33, the processor of the server 21 obtains the data sizes of the location models in the definite peripheral location list, and sets (or accumulates) the obtained data sizes to the total data size. In step S34, the processor of the server 21 performs an open process, which is an example of a second process. This open process adds to the candidate peripheral location list location nodes that are linked to the definite peripheral location list and are not stored in the candidate peripheral location link.

In step S35, the processor of the server 21 selects, from the candidate peripheral location list, a location node having a largest link value (that is, a highest similarity) with respect to a parent location node. In step S36, the processor of the server 21 estimates an estimated value of the total data size, by adding the data size of the location node selected in step S35 to the data sizes of the location models in the definite peripheral location list. In step S37, the processor of the server 21 judges whether the estimated value of the total data size estimated in step S36 is greater than or equal to the limit value, and the process advances to step S40 when the judgment result is YES, and the process advances to step S38 when the judgment result is NO. The limit value may be set according to the storage capacity (or memory size) of the storage unit at each of the mobile terminal 1 and the server 21.

In step S38, the processor of the server 21 performs a close process. This close process adds the selected location node to the definite peripheral location list, in order to make definite the estimated total data size. In step S39, the processor of the server 21 adds to the candidate peripheral location list the location node that is linked to the location node selected by the close process and is not subjected to the open process nor the close process, and the process returns to step S35. In step S40, the processor of the server 21 extracts members (that is, locations) of the definite peripheral location list, and reads from the storage unit of the server 21 and prepares the peripheral location models to be transmitted to the mobile terminal 1.

FIGS. 16 through 20 are diagrams illustrating examples of the place graph used by the peripheral location extracting process. In FIGS. 16 through 20, those parts that are the same are designated by the same reference numerals.

Figure 16:
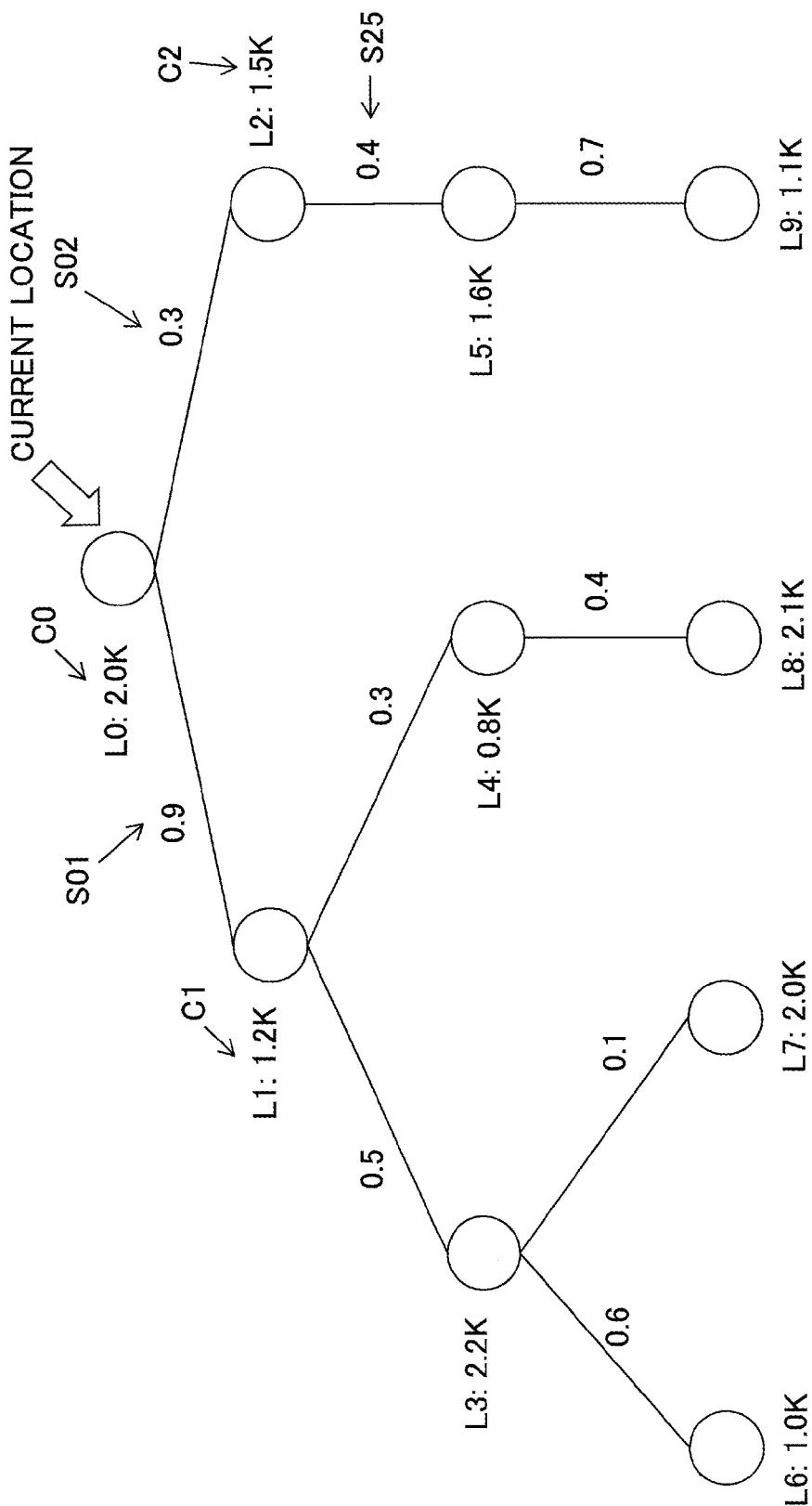
FIG. 16 is a diagram illustrating an example of a place graph used by the peripheral location extracting process.

FIG. 16 illustrates an example of the place graph for a case in which the peripheral locations of the current location are extracted. In this example, the location L0 is the current location, a data size C0 of the location model at the location L0 is 2.0K (K denotes "kilobytes"), a similarity S01 between the locations L0 and L1 is 0.9, the data size of the location model at the location L1 is 1.2K, a similarity between the locations L0 and L2 is 0.3, a data size C2 of the location model at the location L2 is 1.5K, and a similarity S25 between the locations L2 and L5 is 0.4. Other values are as illustrated in FIG. 16.

Figure 17:
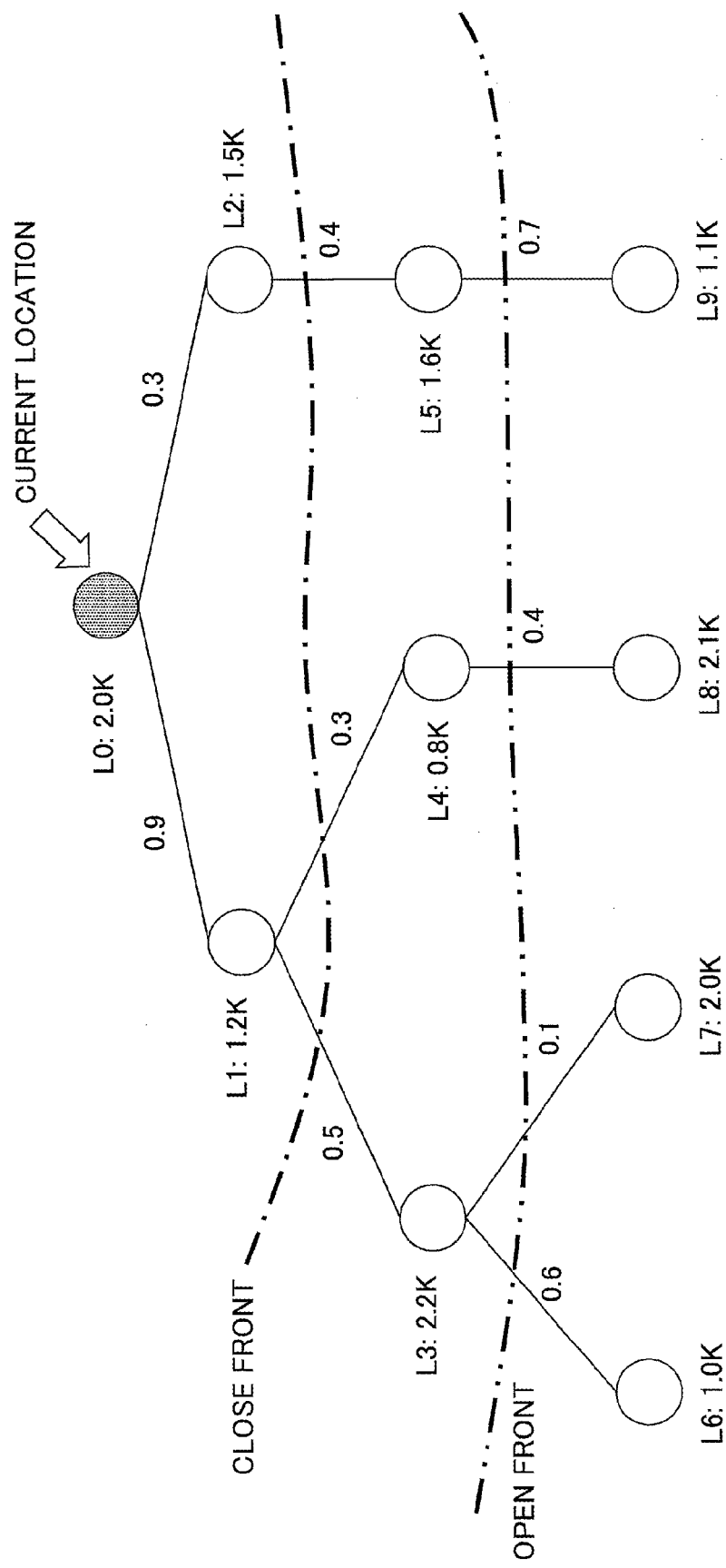
FIG. 17 is a diagram illustrating an example of the place graph used by the peripheral location extracting process.

FIG. 17 illustrates a state after processes of steps S31 through S34 illustrated in FIG. 15 are performed with respect to the place graph illustrated in FIG. 16. In FIG. 17, a close front is indicated by a one-dot chain line, and an open front is indicated by a two-dot chain line. Each location from the current location L0 to the close front is a member of the definite peripheral location list. In addition, each location from the close front to the open front is a member of the candidate peripheral location list. A number of links from the current location node to the close front is smaller than a number of links from the current location node to the open front. Accordingly, in this example, the locations L0, L1, and L2 are stored (or listed) in the definite peripheral location list, and the locations L3, L4, and L5 are stored (or listed) in the candidate peripheral location list. Further, a close total data size is 2.0K+1.2K+0.3K=3.5K<8.0K, and is less than the limit value of 8.0.

Figure 18:
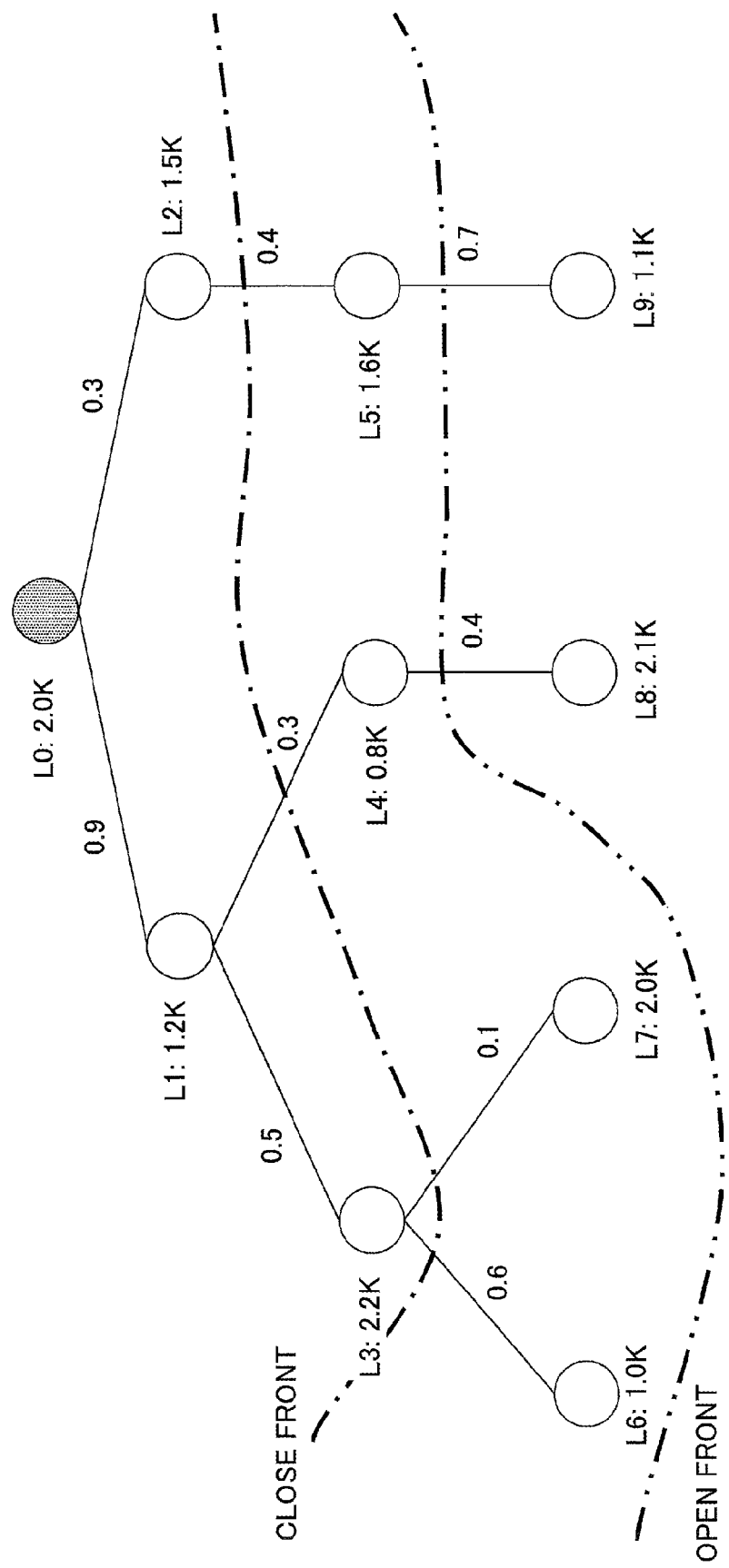
FIG. 18 is a diagram illustrating an example of the place graph used by the peripheral location extracting process.

FIG. 18 illustrates a state after the updating process of steps S35 through S39 illustrated in FIG. 15 is performed for the first time with respect to the place graph illustrated in FIG. 17. In this example, from the candidate peripheral location list, the location having the largest link value from the parent location node is the location L3, the link value S13 is 0.5, and the estimated value does not exceed the limit value even when the data size of the location L3 is added to the close total data size. The close total data size is 2.0K+1.2K+0.3K+2.2K=5.7K<8.0K, and is less than the limit value of 8.0. Accordingly, the location L3 is selected as a candidate for the close process, and the open process is performed with respect to locations L6 and L7 linked to the location L3. As a result, the locations L0, L1, L2, and L3 are stored (or listed) in the definite peripheral location list, and the locations L4, L5, L6, and L7 are stored (or listed) in the candidate peripheral location list.

Figure 19:
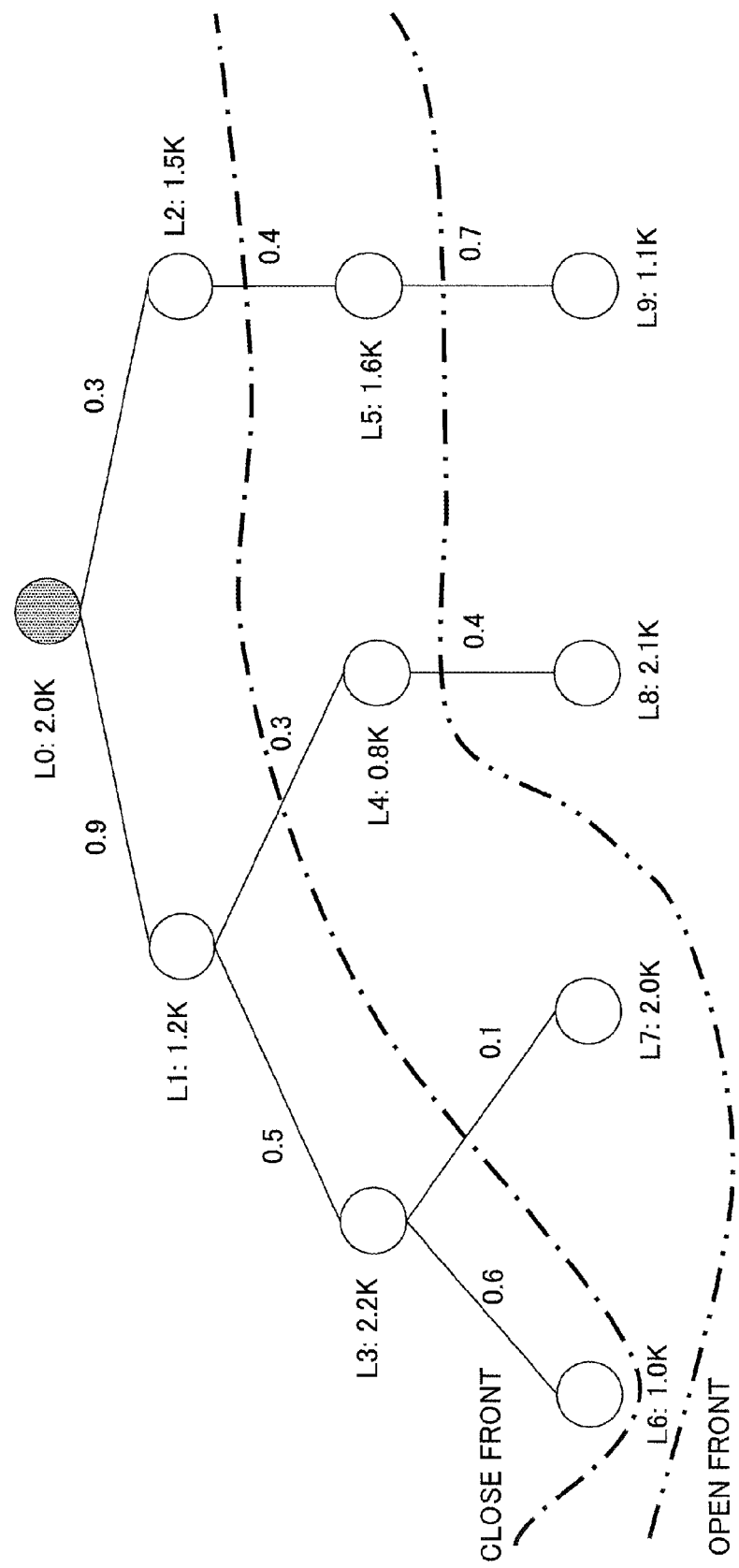
FIG. 19 is a diagram illustrating an example of the place graph used by the peripheral location extracting process.

FIG. 19 illustrates a state after the updating process of steps S35 through S39 illustrated in FIG. 15 is performed for the second time with respect to the place graph illustrated in FIG. 18. In this example, from the locations L4, L5, L6, and L7 stored in the candidate peripheral location list, the location having the largest link value from the parent location node is the location L6, the link value S36 is 0.6, and the estimated value does not exceed the limit value even when the data size of the location L6 is added to the close total data size. The close total data size is 2.0K+1.2K+0.3K+2.2K+1.0K=6.7K<8.0K, and is less than the limit value of 8.0. Accordingly, the location L6 is selected as a candidate for the close process. In this case, there is no location with respect to which the open process is to be newly performed, because there is no location that is linked to the location L6 and has not yet been subjected to the close process nor the open process. As a result, the locations L0, L1, L2, L3, and L6 are stored (or listed) in the definite peripheral location list, and the locations L4, L5, and L7 are stored (or listed) in the candidate peripheral location list.

FIG. 20 illustrates a state after the updating process of steps S35 through S39 illustrated in FIG. 15 is performed for the third time with respect to the place graph illustrated in FIG. 19. In this example, from the locations L4, L5, and L7 stored in the candidate peripheral location list, the location having the largest link value from the parent location node is the location L5, and the link value S25 is 1.6. In this case, when the data size of the location L5 is added to eth close total data size, the estimated value exceeds the limit value. The close total data size is 2.0K+1.2K+0.3K+2.2K+1.0K+1.6K=8.3K>8.0K, and is exceeds the limit value of 8.0. The locations L0, L1, L2, L3, L6, and L5 are stored (or listed) in the definite peripheral location list, and the locations L4 and L7 are stored (or listed) in the candidate peripheral location list. In addition, because the close total data size exceeds the limit value (that is, judgment result in step S37 becomes YES), the updating process of steps S35 through S39 ends, and it is judged (step S40) that the locations L0, L1, L2, L3, and L6 other than the location L5 stored in the definite peripheral location list are the peripheral locations to be extracted.

Therefore, the server 21 extracts the peripheral locations by updating each location that is a member of the definite peripheral location list and exists from the current location to the close front in the place graph, and updating each location that is a member of the candidate peripheral location list and exists from the close front to the open front in the place graph, using the current location of the mobile terminal 1 as the query. In other words, the server 21 extracts the peripheral locations by repeating the updating process in which the locations up to each of the close front and the open front are added to or deleted from the definite peripheral location list and the candidate peripheral location list. In addition, the server 21 includes in the peripheral location model a close front flag that is added to the extracted peripheral location and identifies this extracted peripheral location as being a location up to the close front, and transmits the data of the peripheral location model to the mobile terminal 1. In this example, the close front flag is included in the data of the peripheral location model by the transmitting process, however, the close front flag may of course be included in the data of the peripheral location model by the extracting process. When the mobile terminal 1 moves and the mobile terminal 1 identifies from the close front flag that the new current location after the mobile terminal 1 moves is the close front or a vicinity of the close front, the mobile terminal 1 requests the peripheral location model with respect to the server 21. In response to this request from the mobile terminal 1, the server 21 transmits the data of the extracted peripheral location model to the mobile terminal 1.

FIG. 21 is a diagram illustrating another example of the data structure of the location model. In FIG. 21, those parts that are the same as those corresponding parts in FIG. 5 are designated by the same reference numerals, and a description thereof will be omitted. The data structure of the location model illustrated in FIG. 21 includes, in addition to the data of the peripheral location model to be transmitted from the server 21 to the mobile terminal 1, the close front tag that identifies whether each location node in the place graph is a location node (hereinafter also referred to as a "close front location node") from the current location node to the close front. When a user holding the mobile terminal 1 moves after the peripheral location model is downloaded from the server 21 to the mobile terminal 1, the mobile terminal 1 can judge whether the new current location after the mobile terminal 1 moves is in the vicinity of the close front, based on the close front tag of the peripheral location model. In a case in which the mobile terminal 1 judges that the new current location is in the vicinity of the close front, the mobile terminal 1 can make a download request for the peripheral location model with respect to the server 21.

Figure 22:
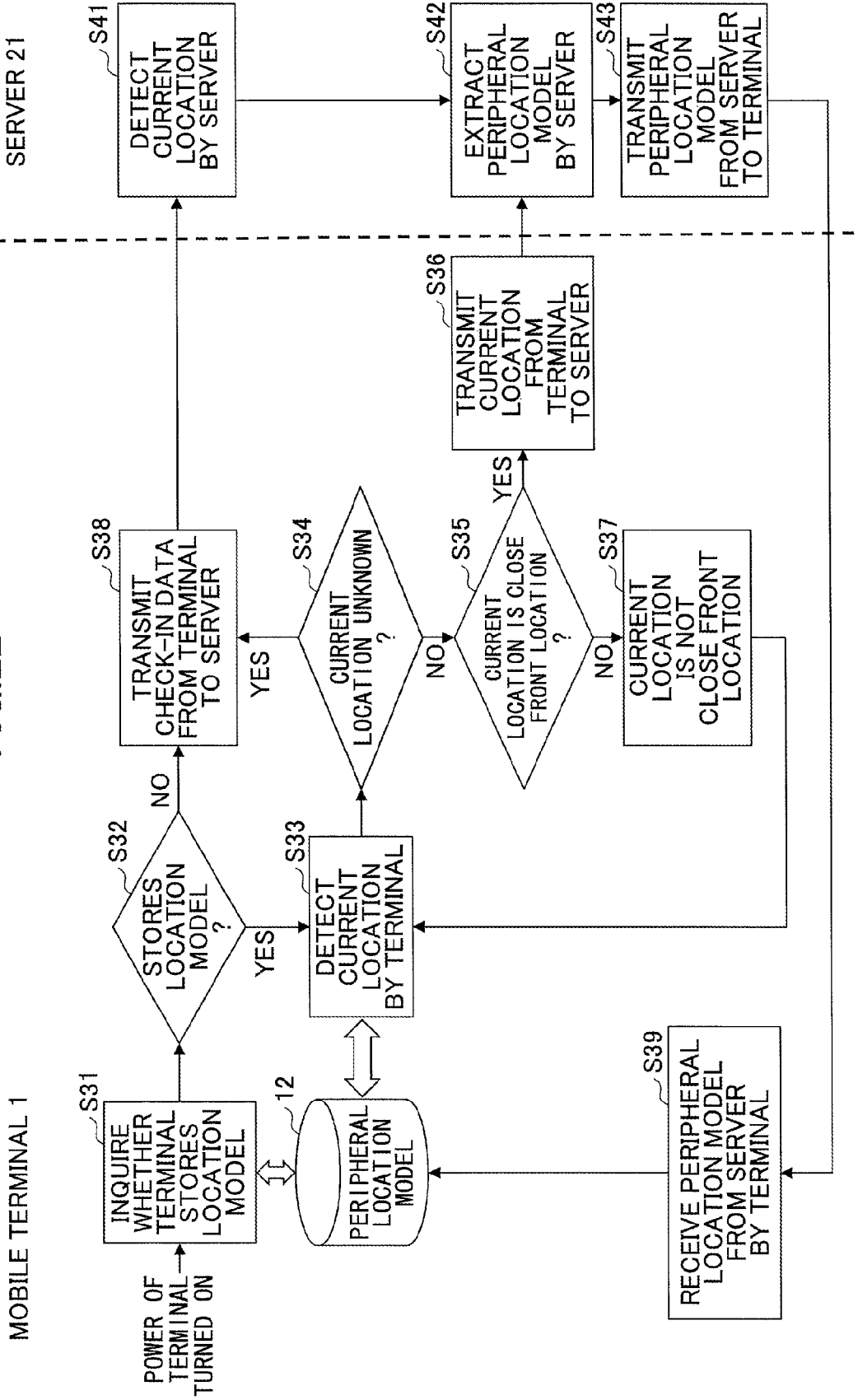
FIG. 22 is a flow chart for generally explaining processes at a server and the mobile terminal.

Next, a description will be given of another example of the updating process to update the peripheral location model at the mobile terminal, by referring to FIG. 22. FIG. 22 is a flow chart for generally explaining processes at the server and the mobile terminal. In FIG. 22, steps S31 through S39 are executed by the processor of the mobile terminal 1, such as the CPU 11, and steps S41 through S43 are executed by the processor of the server 21, such as the PU.

In FIG. 22, when a power of the mobile terminal 1 is turned ON, in step S31, the CPU 11 of the mobile terminal 1 makes an inquiry as to whether the peripheral location model is stored in the storage unit 12 of the mobile terminal 1, that is, whether the mobile terminal 1 stores the peripheral location model. In step S32, the CPU of the mobile terminal 1 judges whether the mobile terminal 1 stores the peripheral location model, based on a response to the inquiry. The process advances to step S33 when the judgment result in step S32 is YES, and the process advances to step S38 which will be described later when the judgment result in step S32 is NO.

In step S33, the CPU 11 of the mobile terminal 11 detects a current location of the mobile terminal 11. In step S34, the CPU 11 of the mobile terminal 1 judges whether the detected current location is unknown, and the process advances to step S35 when the judgment result is NO, and the process advances to step S38 which will be described later when the judgment result is YES. In step S35, the CPU 11 of the mobile terminal 1 judges whether the current location is the close front location up to the close front, and the process advances to step S36 when the judgment result is YES, and the process advances to step S37 when the judgment result is NO. In step S36, the CPU 11 of the mobile terminal 1 transmits the current location to the server 21, in order to make the update request (or download request) for the peripheral location model with respect to the server 21. In step S37, the CPU 11 of the mobile terminal 1 judges that the current location is not the close front location up to the close front, and the process returns to step S33. In step S38, the CPU 11 of the mobile terminal 1 acquires and transmits to the server 21 the check-in data including the MAC address of each AP and the RSSI from the WiFi scan data, in order to makes the request (download request) for the peripheral location model with respect to the server 21.

On the other hand, when the check-in data, that is, the request for the peripheral location model, from the mobile terminal 1 is received at the server 21 in step S41, the CPU of the server 21 detects the current location of the mobile terminal 1 from the received check-in data. In step S42, the CPU of the server 21 extracts the peripheral location model of the current location detected in step S42, or the peripheral location model of the current location transmitted from the mobile terminal 1 in step S36 and received by the server 21. In step S43, the CPU of the server 21 transmits the extracted peripheral location model to the mobile terminal 1.

When the peripheral location model from the server 21 is received by the mobile terminal 1 in step S39, the CPU 11 of the mobile terminal 11 stores the received peripheral location model in the storage unit 12 of the mobile terminal 1, and updates the location model.

Accordingly, in a case in which the mobile terminal 1 stores the location model, the mobile terminal 1 detects the current location, and when the detected current location is unknown, the mobile terminal 1 transmits the check-in data to the server 21 in order to request the peripheral location model. In addition, in a case in which the mobile terminal 1 does not store the location model, the mobile terminal 1 requests the peripheral location model to the server 21 by transmitting the check-in data to the server 21. In these two cases, the server 21 extracts the peripheral location model of the peripheral location in the periphery of the current location, detected based on the check-in data, and transmits the extracted peripheral location model to the mobile terminal 1.

On the other hand, in the case in which the mobile terminal 1 stores the location model, the mobile terminal 1 detects the current location, and the detected current location is the close front location, the mobile terminal 1 transmits the current location with respect to the server 21 in order to request the peripheral location model. In this case, the server 21 extracts the peripheral location model of the peripheral location in the periphery of the current location, and transmits the extracted peripheral location model to the mobile terminal 1.

In the case in which the mobile terminal 1 stores the location model, the mobile terminal 1 detects the current location, and the detected current location is not the close front location, the mobile terminal 1 does not make the update request for the peripheral location model with respect to the server 21.

Figure 23:
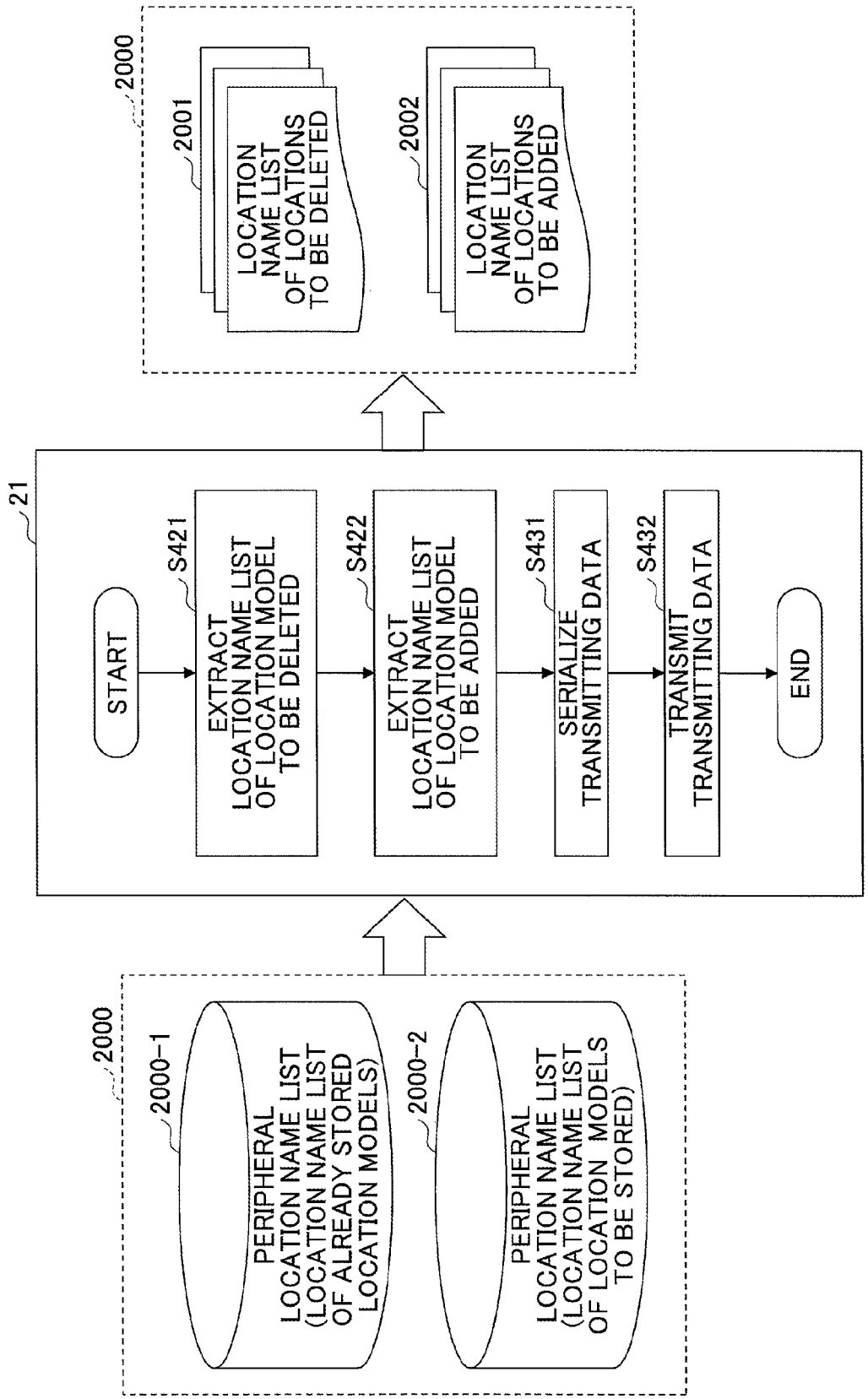
FIG. 23 is a diagram for explaining in more detail a part of the process at the server.

FIG. 23 is a diagram for explaining in more detail processes of steps S42 and S43 performed at the server 21. Data referred to by the processes illustrated in FIG. 23 include a peripheral location name list 2000-1 of the location models already stored in the mobile terminal 1 and received together with the request for the peripheral location model from the mobile terminal 1, and a peripheral location name list 200-2 of the location models that is generated by the location model extracting process of the server 21 and is to be stored in the mobile terminal 1. For example, the peripheral location name lists 2000-1 and 2000-2 may be stored in the storage unit of the server 21. In addition, data generated by the processes illustrated in FIG. 23 include a location name list 2001 of the locations that have become unnecessary and are to be deleted, and a location name list 2002 of the locations that are to be newly added. For example, the location name lists 2001 and 2002 may be stored in the storage unit of the server 21.

In step S421 illustrated in FIG. 23, the CPU of the server 21 extracts the location name list 2001 of the locations to be deleted at the mobile terminal 1, based on the peripheral location name list 2000-1, and stores the extracted location name list 2001 in the storage unit of the server 21. In step S422, the CPU of the server 21 extracts the location name list 2002 of the locations to be added at the mobile terminal 1, based on the peripheral location name list 2000-2, and stores the extracted location name list 2002 in the storage unit of the server 21. In step S431, the CPU of the server 21 serializes the extracted location name lists 2001 and 2002, in order to generate serial transmitting data. In step S432, the CPU of the server 21 transmits the serial transmitting data to the mobile terminal 1.

Figure 24:
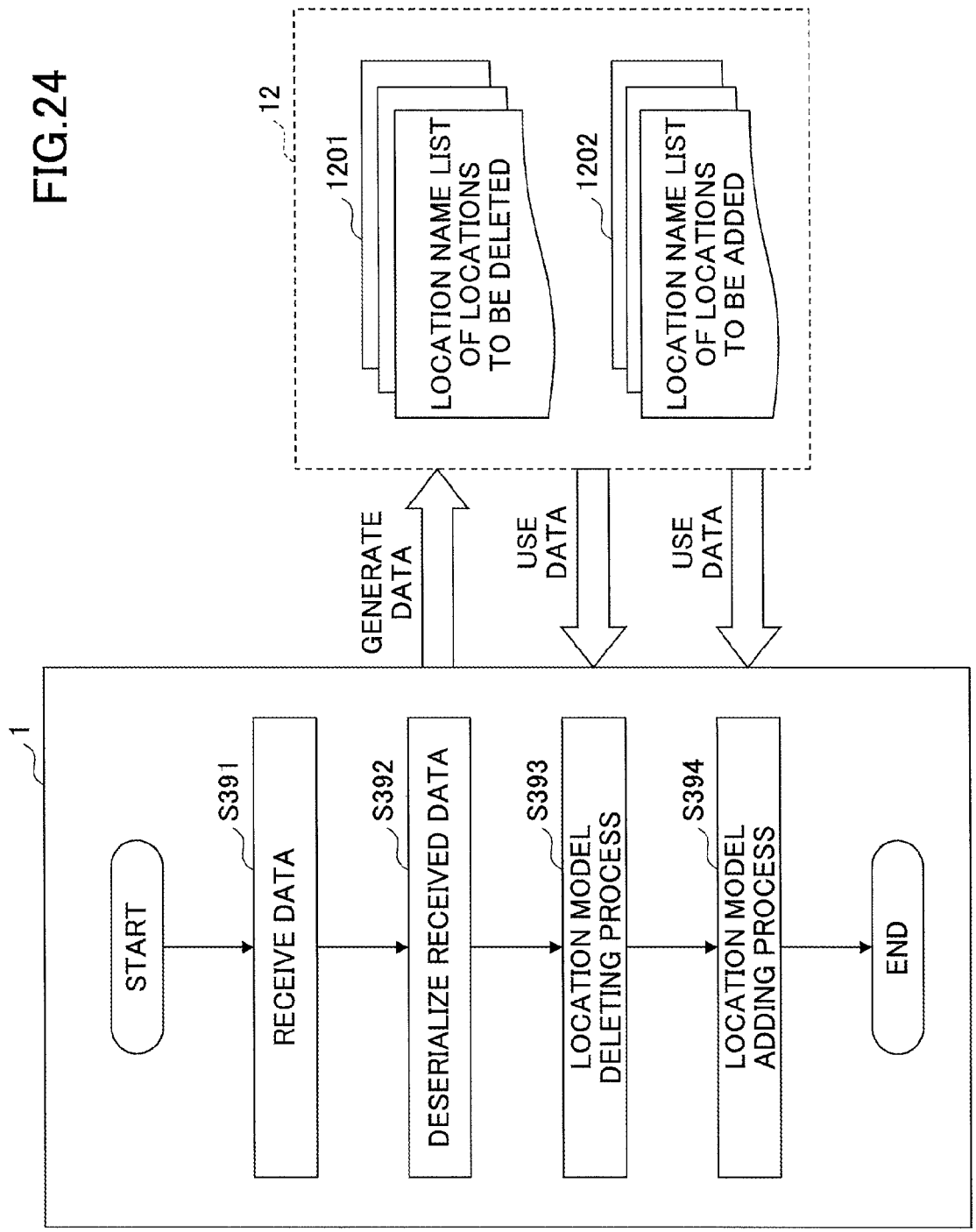
FIG. 24 is a diagram for explaining in more detail a part of the process at the mobile terminal.

FIG. 24 is a diagram for explaining in more detail a process of step S39 performed at the mobile terminal 1. In step S391 illustrated in FIG. 24, the CPU 11 of the mobile terminal 1 receives the serial transmitting data from the server 12. In step S392, the CPU 11 of the mobile terminal 1 deserializes the serial transmitting data received from the server 12, in order to generate a location name list 1201 of the locations to be deleted and a location name list 1202 of the locations to be added. The location name lists 1201 and 1202 that are generated by the deserialization are the same as the location name lists 2001 and 2002, respectively, before the serialization is performed at the server 21. In step S393, the CPU 11 of the mobile terminal 1 performs a deleting process to delete the location names that are to be deleted from the location model stored in the storage unit 12 of the mobile terminal 1, based on the location name list 1201. In step S394, the CPU 11 of the mobile terminal 1 performs an adding process to add the location names that are to be added to the location model stored in the storage unit 12 of the mobile terminal 1, based on the location name list 1202. Hence, even when the mobile terminal 1 moves, it is possible to automatically update the peripheral location models to be used by the mobile terminal 1 for the position estimation.

According to the updating process illustrated in FIGS. 22 through 24, the server 21 does not transmit all of the peripheral location models to the mobile terminal 1, and transmits to the mobile terminal 1 only the difference data corresponding to the difference between the location model already stored in the mobile terminal 1 and the new peripheral location model to be updated. For this reason, the amount of data transmitted and received between the server 21 and the mobile terminal 1 can be reduced, the communication time associated with the updating process can be shortened, and the power consumption associated with the updating process at the mobile terminal 1 can be reduced. In a case in which the mobile terminal 1 is used in a state held by the user who is free to move, the mobile terminal 1 is powered by a battery. Hence, by reducing the power consumption associated with the updating process at the mobile terminal 1, it is possible to suppress the wear of the battery and extend the time for which the mobile terminal 1 is continuously usable by the user.

According to the embodiments described above, it is possible to reduce a storage capacity for storing the location models in the terminal apparatus, without sacrificing the position estimating accuracy.

The description above use terms such as "determine", "identify", or the like to describe the embodiments, however, such terms are abstractions of the actual operations that are performed. Hence, the actual operations that correspond to such terms may vary depending on the implementation, as is obvious to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A location model updating apparatus comprising:
   a storage unit; and
   a processor configured to
      generate attribute data in which an attribute of a location is represented by a location name and a data size of a location model, and an attribute between locations is represented by a similarity between the locations;
      extract a peripheral location by including each location from a current location of a terminal apparatus to a first front as a member of a definite peripheral location list, including each location from the first front to a second front as a member of a candidate peripheral location list, and updating each location that is a member of the definite peripheral location list and exists from the current location to the first front, and each location that is a member of the candidate peripheral location list and exists from the first front to the second front, using the current location of the terminal apparatus as a query; and
      transmit data of a peripheral location model of the peripheral location that is extracted, to the terminal apparatus, by including in the peripheral location model a flag identifying the peripheral location that is extracted as a location up to the first front.

2. The location model updating apparatus as claimed in claim 1, wherein the processor transmits, to the terminal apparatus, difference data between the location model stored in the terminal apparatus and received from the terminal apparatus, and the peripheral location model extracted by the processor.

3. The location model updating apparatus as claimed in claim 1, wherein the processor transmits the data of the peripheral location model of the peripheral location that is extracted, to the terminal apparatus, in response to a request received from the terminal apparatus when the terminal apparatus identifies from the flag that a new current location after the terminal apparatus moves is the first front or a vicinity of the first front.

4. The location model updating apparatus as claimed in claim 1, wherein
the attribute between the locations includes similarities of features between the locations, and
the features include features related to frequencies of an observing state and an observation missing state of signals from base stations at the terminal apparatus, and features related to received signal strengths at the terminal apparatus.

5. A position estimating method to estimate a position of a terminal apparatus that is communicable with a plurality of base stations, comprising:
estimating, in the terminal apparatus, the position of the terminal apparatus based on a location model stored within the terminal apparatus;
updating, in the terminal apparatus, the location model based on data downloaded from a server; and
performing, in a server, a location model updating process to update the location model stored in a storage unit of the server based on data received from the terminal apparatus, and a transmitting process,
wherein the location model updating process includes
generating attribute data in which an attribute of a location is represented by a location name and a data size of a location model, and an attribute between locations is represented by a similarity between the locations;
extracting a peripheral location by including each location from a current location of a terminal apparatus to a first front as a member of a definite peripheral location list, including each location from the first front to a second front as a member of a candidate peripheral location list, and updating each location that is a member of the definite peripheral location list and exists from the current location to the first front, and each location that is a member of the candidate peripheral location list and exists from the first front to the second front, using the current location of the terminal apparatus as a query; and
wherein the transmitting process includes
transmitting data of a peripheral location model of the peripheral location that is extracted, to the terminal apparatus, by including in the peripheral location model a flag identifying the peripheral location that is extracted as a location up to the first front.

6. The position estimating method as claimed in claim 5, wherein the transmitting process transmits, to the terminal apparatus, difference data between the location model stored in the terminal apparatus and received from the terminal apparatus, and the peripheral location model extracted by the server.

7. The position estimating method as claimed in claim 5, wherein
the terminal apparatus transmits a request with respect to the server when the terminal apparatus identifies from the flag that a new current location after the terminal apparatus moves is the first front or a vicinity of the first front. and
the server transmits the data of the peripheral location model of the peripheral location that is extracted, to the terminal apparatus, in response to the request received from the terminal apparatus.

8. The position estimating method as claimed in claim 5, wherein
the attribute between the locations includes similarities of features between the locations, and
the features include features related to frequencies of an observing state and an observation missing state of signals from base stations at the terminal apparatus, and features related to received signal strengths at the terminal apparatus.

9. A non-transitory computer-readable storage medium having stored therein a program for causing a computer to execute a process to update a location model based on data received from a terminal apparatus, the process comprising:
generating attribute data in which an attribute of a location is represented by a location name and a data size of a location model, and an attribute between locations is represented by a similarity between the locations;
extracting a peripheral location by including each location from a current location of a terminal apparatus to a first front as a member of a definite peripheral location list, including each location from the first front to a second front as a member of a candidate peripheral location list, and updating each location that is a member of the definite peripheral location list and exists from the current location to the first front, and each location that is a member of the candidate peripheral location list and exists from the first front to the second front, using the current location of the terminal apparatus as a query; and
transmitting data of a peripheral location model of the peripheral location that is extracted, to the terminal apparatus, by including in the peripheral location model a flag identifying the peripheral location that is extracted as a location up to the first front.

10. The non-transitory computer-readable storage medium as claimed in claim 9, wherein the transmitting transmits, to the terminal apparatus, difference data between the location model stored in the terminal apparatus and received from the terminal apparatus, and the peripheral location model extracted by the extracting.

11. The non-transitory computer-readable storage medium as claimed in claim 9, wherein the transmitting transmits the data of the peripheral location model of the peripheral location that is extracted, to the terminal apparatus, in response to a request received from the terminal apparatus when the terminal apparatus identifies from the flag that a new current location after the terminal apparatus moves is the first front or a vicinity of the first front.

12. The non-transitory computer-readable storage medium as claimed in claim 9, wherein
the attribute between the locations includes similarities of features between the locations, and
the features include features related to frequencies of an observing state and an observation missing state of signals from base stations at the terminal apparatus, and features related to received signal strengths at the terminal apparatus.

* * * * *